US012281904B1

(12) United States Patent
Espel-Logan

(10) Patent No.: US 12,281,904 B1
(45) Date of Patent: Apr. 22, 2025

(54) SUSTAINABILITY-BASED TRANSPORTATION RECOMMENDATION SYSTEM

(71) Applicant: State Farm Mutual Automobile Insurance Company, Bloomington, IL (US)

(72) Inventor: Catherine Espel-Logan, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/614,422

(22) Filed: Mar. 22, 2024

Related U.S. Application Data

(60) Provisional application No. 63/622,991, filed on Jan. 19, 2024, provisional application No. 63/553,968, filed on Feb. 15, 2024.

(51) Int. Cl.
*G01C 21/34* (2006.01)
*G01C 21/36* (2006.01)

(52) U.S. Cl.
CPC ..... *G01C 21/3423* (2013.01); *G01C 21/3469* (2013.01); *G01C 21/3492* (2013.01); *G01C 21/3617* (2013.01)

(58) Field of Classification Search
CPC ............ G01C 21/3423; G01C 21/3469; G01C 21/3492; G01C 21/3617
See application file for complete search history.

(56) References Cited

U.S. PATENT DOCUMENTS

| 8,744,766 | B2* | 6/2014 | Rakshit | G01C 21/3461 |
| | | | | 701/527 |
| 9,435,659 | B1* | 9/2016 | Kozloski | G01T 1/02 |
| 10,217,169 | B2 | 2/2019 | Schumann et al. | |
| 10,295,356 | B1 | 5/2019 | Cope et al. | |

(Continued)

OTHER PUBLICATIONS

U.S. Appl. No. 17/190,928, filed Mar. 3, 2021, Joseph Robert Brannan; Brian N. Harvey; Darwin Gene Beachy; Matthew Eric Riley Sr.; Benjamin Joel Tucker; Michael Aaron Myers; Ryan Michael Gross.

*Primary Examiner* — Luis A Martinez Borrero
(74) *Attorney, Agent, or Firm* — Foley & Lardner LLP

(57) ABSTRACT

A transportation system for generating a transportation recommendation may (1) receive a transportation request; (2) identify, using the transportation request, a first geographic location and a second geographic location associated with the transportation request; (3) determine, using the first geographic location and the second geographic location, a plurality of routes between the first geographic location and the second geographic location: and/or (4) generate a sustainability impact score for each of the plurality of routes, The sustainability impact score may indicate an estimated climate impact of using at least one transportation modality to travel along the route. The transportation system may also (5) select a recommended route from the plurality of routes using the sustainability impact scores of the plurality of routes; and/or (6) generate a user interface providing the recommended route or otherwise present the recommend route and other information on a user device.

20 Claims, 5 Drawing Sheets

(56) References Cited

U.S. PATENT DOCUMENTS

| | | | |
|---|---|---|---|
| 10,430,883 B1 | 10/2019 | Bischoff et al. | |
| 10,480,950 B2* | 11/2019 | Schmelzer | G01C 21/3461 |
| 10,527,439 B2* | 1/2020 | Duan | G08G 1/0141 |
| 10,540,723 B1 | 1/2020 | Potter et al. | |
| 10,586,288 B2 | 3/2020 | Biemer et al. | |
| 10,670,413 B2* | 6/2020 | George | G01C 21/3469 |
| 10,887,722 B2* | 1/2021 | Borrel | H04L 67/52 |
| 11,022,447 B2* | 6/2021 | Akselrod | E05F 15/70 |
| 11,182,392 B2* | 11/2021 | Korber | G06F 16/24578 |
| 11,385,064 B2* | 7/2022 | Schmelzer | G01C 21/3407 |
| 11,797,931 B1* | 10/2023 | Gross | G01C 21/3461 |
| 11,953,328 B2* | 4/2024 | Wilczynski | G01C 21/3415 |
| 2013/0080053 A1* | 3/2013 | Rakshit | G01C 21/3469 |
| | | | 701/527 |
| 2019/0277642 A1* | 9/2019 | Schmelzer | G06Q 10/06393 |
| 2021/0010816 A1* | 1/2021 | Schmelzer | G06Q 50/40 |
| 2023/0196246 A1* | 6/2023 | Beaurepaire | G06Q 10/0637 |
| | | | 705/7.36 |
| 2023/0306457 A1* | 9/2023 | Ramirez | G08G 1/0129 |
| 2023/0419262 A1* | 12/2023 | Gross | G06Q 10/10 |
| 2024/0264650 A1* | 8/2024 | Norris | G06Q 10/047 |

* cited by examiner

SUSTAINABILITY-BASED TRANSPORTATION RECOMMENDATION SYSTEM

CROSS-REFERENCE TO RELATED APPLICATIONS

This application claims priority to and the benefit of U.S. Provisional Patent Application Ser. No. 63/622,991, filed Jan. 19, 2024, and U.S. Provisional Patent Application Ser. No. 63/553,968, filed Feb. 15, 2024, both of which are incorporated herein by reference in their entireties.

FIELD OF THE INVENTION

The present disclosure generally relates to transportation systems. More particularly, the present systems and methods relate to using a transportation system to provide transportation recommendations that allow individuals to assess the sustainability impacts of different travel routes and/or transportation modalities when traveling to various locations.

BACKGROUND

Individuals may use various modes, or combinations of modes, of transportation to travel between various locations. For example, an individual may utilize their single-occupant vehicle, a ride share service, public or private transportation, and/or alternative modes of transportation (e.g., biking, walking, skateboarding, etc.) to travel to and from work or school.

However, different modes and/or routes of transportation may have different impacts on carbon emissions and other sustainability considerations. Conventional techniques may also have certain ineffectiveness, inefficiencies, encumbrances, and/or other drawbacks as well.

BRIEF SUMMARY

A transportation computer system may be provided that generates recommendations related to different types of transportation, such as to facilitate (i) alleviating the negative impact of travel on the environment and (ii) reducing climate change. For instance, different modes and routes of transportation may be analyzed to assess and/or calculate their individual or collective impacts on carbon emissions, pollution, and/or other sustainability factors. A user interface may be presented to a user, such as on a mobile device or other computing device, displaying the impact of the different modes of transportation and/or different routes taken may have on the environment, such as display an amount of carbon emissions and/or pollution estimated to be cause by each mode of transportation and route (or route segment taken with a different mode of transportation).

In one aspect, a transportation computer system for generating a transportation recommendation and/or displaying environmental impacts or transportation modes and/or routes may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots, chatbots, ChatGPT bots, InstructGPT bots, Codex bots, Google Bard bots, and/or other electronic or electrical components, which may be in wired or wireless communication with one another. For example, in one instance, the computer system may include one or more processors and one or more non-transitory memories storing processor-executable instructions that, when executed by the one or more processors, cause the system to perform several operations, including (1) receiving a transportation request, and identifying, using the transportation request, a first geographic location and a second geographic location associated with the transportation request; (2) determining, using the first geographic location and the second geographic location, a plurality of routes between the first geographic location and the second geographic location; (3) generating a sustainability impact score for each of the plurality of routes, the sustainability impact score indicating an estimated climate impact of using at least one transportation modality or mode to travel along the route; (4) selecting a recommended route from the plurality of routes using, at least in part, the sustainability impact scores of the plurality of routes; and/or (5) generating a user interface providing the recommended route or otherwise presenting the recommended route to a user, such as presenting the recommended route graphically on a computer device display screen or audibly via a voice bot or chatbot. The computer system may include additional, less, or alternate functionality and/or operations, including that discussed elsewhere herein.

For instance, in certain embodiments, the functionality and/or operations may include selecting the recommended route responsive to determining the recommended route has a sustainability impact score indicating a lowest estimated climate impact of the estimated climate impacts of the plurality of routes. Additionally or alternatively, the functionality and/or operations may include (i) receiving data that includes or indicates an electric power characteristic of the at least one transportation modality, and/or (ii) generating the sustainability impact score for each of the plurality of routes using, at least in part, the electric power characteristic of the at least one transportation modality and/or other data types, including those mentioned elsewhere herein.

In some implementations, the functionality and/or operations may include (a) receiving user data including historic transportation characteristics of a user. The historic transportation characteristics may include one or more of (i) an average transportation speed; (ii) an average number of turns during a travel event; and/or (iii) an average travel time. The functionality and/or operations may also include (b) generating the sustainability impact score for each of the plurality of routes using, at least in part, the historic transportation characteristics of the user and/or other data types, including those mentioned elsewhere herein.

Additionally or alternatively, the functionality and/or operations may include (a) receiving geographic data associated with the plurality of routes. The geographic data may include one or more of (i) a road density score indicating a number of crossroads along a route; (ii) a construction rating indicating one or more construction events along a route; and/or (iii) an efficient travel option indicating availability of a lane available to vehicles traveling with multiple occupants along a route. The functionality and/or operations may also include (b) generating the sustainability impact score for each of the plurality of routes using, at least in part, the geographic data, and/or other data types, including those mentioned elsewhere herein.

In various implementations, the functionality and/or operations may include (a) receiving historic transportation data associated with each of the plurality of routes. The historic transportation data may include one or more of (i) an average transportation speed; (ii) an average number of turns during a travel event; (iii) an average number of stops during a travel event; and/or (iv) an average travel time during a travel event. The functionality and/or operations may include (b) generating the sustainability impact score for each of the plurality of routes using, at least in part, the historic transportation data and/or other data types, including those mentioned elsewhere herein.

In some implementations, the functionality and/or operations may include (i) receiving a time associated with the transportation request, and/or (ii) generating the sustainability impact score for each of the plurality of routes using, at least in part, the time associated with the transportation request and/or other data types, including those mentioned elsewhere herein. In certain embodiments, the sustainability impact score may be associated with a fuel efficiency of the at least one transportation modality along the route.

In certain implementations, the functionality and/or operations may include (i) receiving audiovisual data associated with at least one travel event of a user (such as date from vehicle sensors, mobile device sensors, smart home sensors, AR (augmented reality) glasses, wearables, smart glasses, smart watches, VR (virtual reality) headsets, or other input and/or output computing devices; and/or (ii) generating the sustainability impact score for each of the plurality of routes using, at least in part, the audiovisual data and/or other data types, including those mentioned elsewhere herein.

In some implementations, the functionality and/or operations may include (i) generating at least one insurance policy parameter associated with the recommended route and the at least one transportation modality (or mode), and/or (ii) providing the at least one insurance policy parameter via the user interface. Additionally or alternatively, the functionality and/or operations may include (1) generating the user interface providing the plurality of recommended routes; (2) receiving a selection of a selected route; and/or (3) providing the user interface including at least one insurance policy parameter associated with the selected route or otherwise providing, presenting, or outputting the at least one insurance policy parameter to a user, such as audibly via a voice bot or chatbot, or visually or graphically via a computing device display, such as a mobile device, VR headset, AR glasses, a smart vehicle control console or display, or other computing devices, including those mentioned elsewhere herein.

In certain embodiments, the functionality and/or operations may include (identifying a plurality of transportation modality (or mode) options for traveling between the first geographic location and the second geographic location, each of the plurality of transportation modality options including at least one transportation modality (or mode) option. Additionally or alternatively, the functionality and/or operations may include generating a sustainability impact score for each of the plurality of transportation modality options. The sustainability impact score indicating an estimated climate impact of using the at least one transportation modality option to travel between the first geographic location and the second geographic location. Further, the functionality and/or operations may include (i) selecting a recommended transportation modality option from the plurality of transportation modality options using, at least in part, the sustainability impact scores of the plurality of transportation modality options, and/or (ii) generating the user interface providing the recommended transportation modality option or otherwise providing or presenting the recommended transportation modality option to a user, such visually and/or audibly via a mobile device, AR glasses, VR headset, voice bot, chatbot, a smart vehicle control console or display, or other computing devices, including those mentioned elsewhere herein.

In another aspect, a computer-implemented method for generating a transportation recommendation and/or displaying environmental impacts or transportation modes and/or routes may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice bots or chatbots, ChatGPT bots, InstructGPT bots, Codex bots, Google Bard bots, and/or other electronic or electrical components, which may be in wired or wireless communication with one another. In one instance, the computer-implemented method may include, such as via one or more local or remote processors, transceivers, sensors, other electronic components, including those discussed elsewhere herein, and/or computer-readable storage media having instructions stored thereon executable by the processors, transceivers, sensors, and/or other electronic components, (1) receiving a transportation request and identifying a first geographic location and a second geographic location associated with the transportation request; (2) identifying a plurality of transportation. modality (or mode) options for traveling between the first geographic location and the second geographic location, each of the plurality of transportation modality options including at least one transportation modality; (3) generating a sustainability impact score for each of the plurality of transportation modality options, the sustainability impact score indicating an estimated climate impact of using the at least one transportation modality to travel between the first geographic location and the second geographic location; (4) selecting a recommended transportation modality option from the plurality of transportation modality options using the sustainability impact scores of the plurality of transportation modality options; and/or (5) generating a user interface providing the recommended transportation modality option, or otherwise visually and/or audibly presenting the recommended transportation modality option to a user, such as via a mobile device, AR glasses, VR headset, voice bot, chatbot, a smart vehicle control console or display, or other computing device. The method may include additional, less, or alternate functionality, including that discussed elsewhere herein.

For instance, the computer-implemented method may include, such as via one or more processors and/or other electronic components, (i) receiving a user preference of a transportation modality option selected from the plurality of transportation modality options; and/or (ii) selecting the recommended transportation modality option using the user preference. In certain embodiments, the transportation modality or mode may include at least one of a bicycle, a scooter, a bus, vehicle, a shared vehicle, a train, and/or an airplane.

In some implementations, the computer-implemented method may include, such as via one or more processors and/or other electronic components, (i) receiving audiovisual data associated with at least one travel event of a user; and/or (ii) selecting the recommended transportation modality option using the audiovisual data. Additionally or alternatively, the computer-implemented method may include, such as via one or more processors and/or other electronic components, including those discussed elsewhere herein, (i) receiving travel data including geolocation information of a user as the user travels between the first geographic location and the second geographic location; and/or (ii) comparing and analyzing the travel data with historical travel data associated with the recommended transportation modality option to verify the recommended transportation modality option.

In certain embodiments, the computer-implemented method may include, such as via one or more processors and/or other electronic components, (1) determining, using, at least in part, the first geographic location and the second geographic location, a plurality of routes between the first geographic location and the second geographic location; (2) generating a sustainability impact score for each of the plurality of routes, the sustainability impact score indicating an estimated climate impact of using at least one transportation modality option to travel along the route; (3) generating the user interface providing the plurality of routes and the sustainability impact associated with each route (the user interface may further include a travel time and a safety factor associated with each of the plurality of routes); (4) receiving a selection of a selected route of the plurality of routes; and/or (5) providing the user interface including the selected route of the plurality of routes or otherwise visually or audibly presenting the selected route to a user, such as via a mobile device, VR headset, AR glasses, voice bot, chatbot, a smart vehicle control console or display, or other computing device. The method may include additional, less, or alternate functionality, including that discussed elsewhere herein.

In another aspect, a non-transitory computer readable medium having instructions stored thereon that, when executed by one or more processors, cause the one or more processors to perform various functionality and operations. For instance, the functionality and operations may include or direct (1) receiving a transportation request; (2) identifying, using at least the transportation request, a first geographic location and a second geographic location associated with the transportation request; (3) determining, using at least the first geographic location and the second geographic location, a plurality of routes between the first geographic location and the second geographic location; (4) identifying a plurality of transportation modality options for traveling between the first geographic location and the second geographic location, each of the plurality of transportation modality options including at least one transportation modality; (5) generating a sustainability impact score for each combination of the plurality of routes and the plurality of transportation modality options, the sustainability impact score indicating an estimated climate impact of using the at least one transportation modality along the plurality of routes; (6) selecting a recommended route from the plurality of routes and/or a recommended transportation modality option from the plurality of transportation modality options using at least the sustainability impact scores; and/or (7) generating a user interface providing the recommended route and/or the recommended transportation modality option or otherwise presenting the recommended route and/or recommended transportation modality option to a user, such as via graphically or audibly via one or more computing devices. The instructions may direct additional, less, or alternate functionality and/or operations, including that discussed elsewhere herein.

For instance, in some implementations, the functionality and operations may include (i) receiving a user preference indicating a relative preference between at least one of the plurality of transportation modality options and/or the plurality of routes; and/or (ii) selecting the recommended route and/or the recommended transportation modality option using the user preference.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
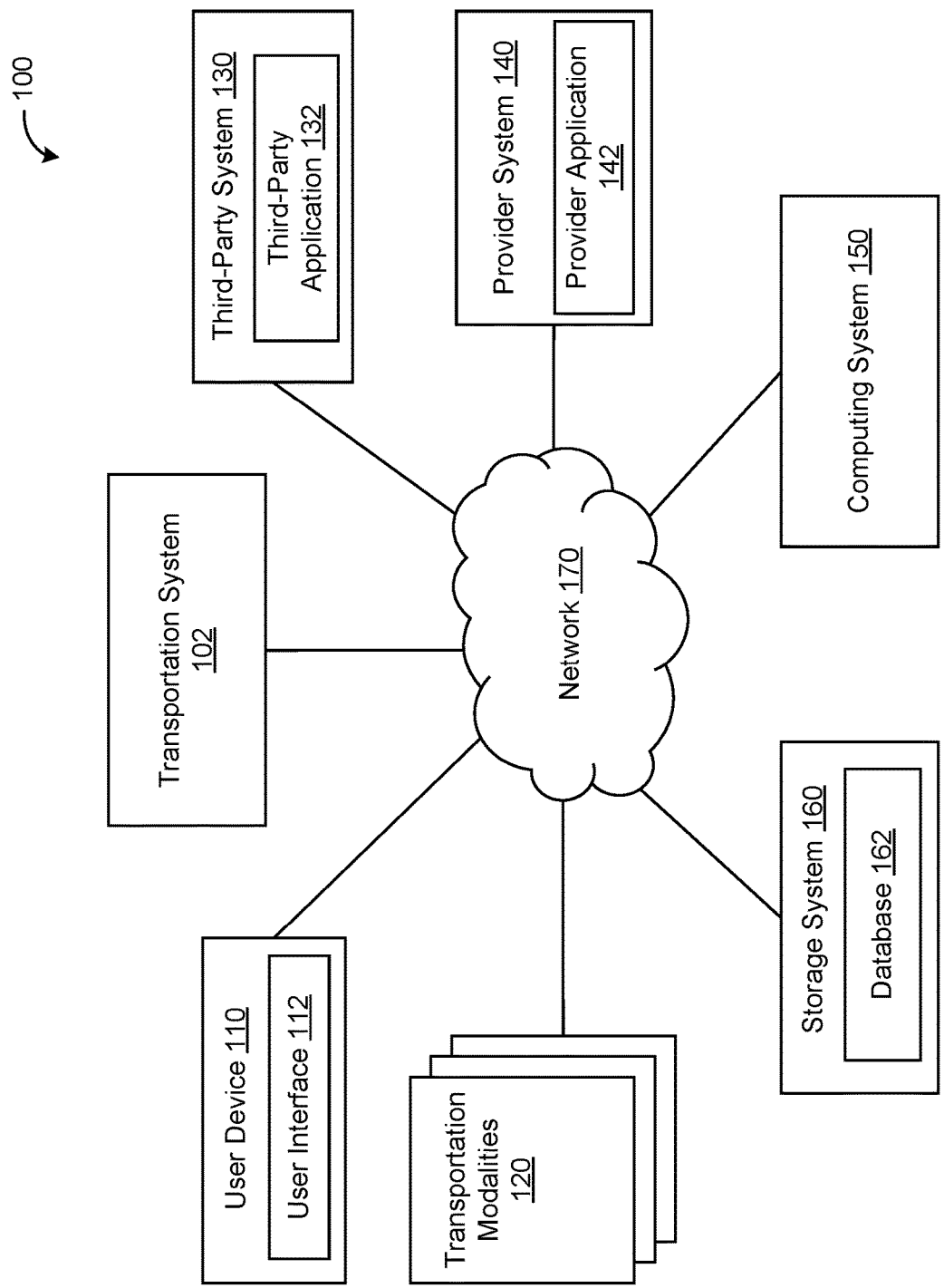
FIG. 1 is a block diagram of an exemplary travel services computer system, according to some embodiments.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The present embodiments relate to, inter alia, a transportation computer system that generates recommendations related to different types of transportation, such as to facilitate alleviating the negative impact of travel on the environment and reduce climate change. For instance, different modes and routes of transportation may be analyzed to assess and/or calculate their different impacts on carbon emissions, pollution, and/or other sustainability factors. A user interface may be presented to user, such as on a user mobile device, AR glasses, VR headset, or other computing device, displaying the impact of the different modes of transportation and/or different routes taken may have the environment, such as display an amount of carbon emissions and/or pollution.

OVERVIEW

Referring to the Figures, computer systems and computer-implemented methods for generating and/or providing a transportation recommendation may be provided. For example, the computer system may be configured to receive a transportation request and identify a first and a second location based upon the transportation request. The system may determine a plurality of routes between the first and second locations, and/or a plurality of transportation modality (or mode) options (e.g., a vehicle, a ride share, a bus, a train, a bicycle, a scooter, etc.) for traveling between the first and second locations.

Using the plurality of routes and/or the plurality of transportation modality options, a sustainability impact score may be generated for each of the routes, transportation modalities, and/or combinations thereof. The sustainability impact score may indicate an estimated climate impact of traveling along each of the routes and/or using the associated transportation modality (or combinations thereof). Using the sustainability impact scores, a recommended route, a recommended transportation modality, and/or a combination thereof may be selected and provided via a user interface.

In some embodiments, the recommended route and/or transportation modality is/are selected based upon an associated impact score indicating a lowest estimated climate impact (e.g., relative to the estimated climate impact of the plurality of routes/modalities) and/or lowest estimated environmental impact. Advantageously, the systems and methods described herein may allow individuals to identify climate-conscious routes and/or transportation modalities, which may be used to reduce and/or limit the climate impact of traveling between certain locations (e.g., along certain routes) and/or using certain transportation modalities.

Advancements in transportation infrastructure have afforded individuals the ability to choose between various routes of travel and/or modes of transportation (or combinations of modes of transportation) when traveling between different locations. For example, an individual may decide to take a more efficient route (e.g., a freeway that avoids traffic associated with an accident or construction) using one of their single-occupant vehicles (e.g., a hybrid car, a gas-powered truck, etc.) to travel to work. Similarly, an individual may decide to take public transportation to work, for example by walking or biking, or taking a ride share service, to a public transportation station, and choosing a mode of public transportation (e.g., a bus, a train, a shuttle, etc.) to commute the rest of the way to work.

In addition to being interested in traveling efficiently between different locations, individuals are now becoming more interested in travel options that reduce their environmental footprint (e.g., carbon emissions, fuel consumption, energy consumption, pollution, fossil fuel usage) and/or offer safer travel options when traveling to certain locations. While an individual may currently be able to evaluate travel times associated with various travel routes and/or modes of transportation, it should be noted that different travel routes and/or types of transportation can have different sustainability impacts on our environment (e.g., carbon emissions, fuel consumption, resource consumption, etc.), the impacts of which are less visible to individuals. As such, it would be advantageous to have a computer system that allows an individual to evaluate the environmental impact of travel between locations along different routes and/or using different transportation modalities.

Advantageously, one aspect of the computer systems and computer-implemented methods described herein may allow individuals to identify climate-conscious routes and/or transportation modalities. For example, by assessing travel characteristics of a user or operator (e.g., a tendency to speed, a tendency to accelerate/decelerate quickly, fuel efficiency of their vehicle, fuel usage of their vehicle, pollution and/or other emissions caused by their vehicle, etc.) and/or travel situations (e.g., road construction, a lane closure, traffic due to an accident, weather conditions, traffic congestion due to time-of-day (rush hour) or year (holiday traffic), type of road, urban versus rural roads/travel, etc.), the computer systems and computer-implemented methods described herein may identify a recommended route that reduces/limits climate impact associated with traveling (e.g., identifying a fuel-efficient route, a route that reduces stops/starts or sitting in traffic, a route that avoids rush hour congestion, a route that avoids bad weather (rain, ice, snow, etc.), a route that avoids traffic lights, a route that avoids hills or up and down roads, etc.). As a result, individuals may be incentivized to use routes that reduce their environmental impact.

Similarly, by assessing available travel options or routes (e.g., walking or running via various sidewalks or trails; bicycling via various bike lanes, trails, or road shoulders; public transportation; ride share or shuttle services; e-scooters or mini-scooters; motorcycles; autonomous vehicles; electric vehicles; gasoline-based vehicles; hybrid vehicles; etc.) and/or travel situations (e.g., road construction; traffic due to an accident; delays/slowdowns due to inclement weather; congestion; rush hour time-of-day; etc.), the computer systems and computer-implemented methods described herein may identify a type of transportation (or combinations thereof) that reduce/limit negative climate impact associated with traveling (e.g., identifying an alternative mode of transportation, identifying a mode that is a multi-occupant mode of transportation, identifying a specific route and/or time-of-day to travel to reduce pollution or other climate impact, etc.).

As a result, individuals may be incentivized to use transportation options that reduce their environmental impact. Finally, by assessing and analyzing travel characteristics of a user or operator, available travel options, and/or travel scenarios, the computer systems and computer-implemented methods described herein may identify a specific combination of a travel route and a transportation type (or combinations thereof) that identify a transportation route/method that provides a lowest estimated (negative) climate impact (e.g., carbon emissions, fuel consumption, oil or gas spillage, pollution, road wear and tear, etc.) of traveling to a destination.

Advantageously, one aspect of the computer systems and computer-implemented methods described herein may allow individuals to identify safe routes and/or transportation modality options. For example, by assessing travel characteristics of a user or operator (e.g., a tendency to travel at a proper speed and/or otherwise obey the posted speed limit, a tendency to accelerate/decelerate as required, a tendency to travel at a reasonable following distance from other vehicles, a tendency to follow proper rules of the road and street signs, a tendency to obey stop signs, etc.), available travel options (e.g., walking or biking (such as on sidewalks, bike lanes or trails, road shoulders); public transportation; automobile; bus; scooters; taxi; plane; boat; etc.), and/or travel situations (e.g., road construction; traffic due to an accident; delays/slowdowns due to inclement weather; rush hour traffic; time-of-day or time-of-year; congestion; type of route (urban or rural; two lane road versus four lane highway, etc.); length of route; etc.), the computer systems and computer-implemented methods described herein may identify a route and/or transportation type (or combinations thereof) that limits/reduces potential risks to a user while traveling to a destination (e.g., risk of being in an accident, risk of getting injured, risk of getting stranded in inclement weather conditions, etc.).

Further, the computer systems and computer-implemented methods described herein may be configured to provide individuals with protective services (e.g., coverage, etc.) over various routes and/or transportation modalities, for example based upon an estimated climate impact and/or safety score of the associated route/modality, thereby providing individuals with increased coverage, reducing an individual's level of risk (e.g., injury or financial risk, etc.), and/or reducing an individual's resource consumption (e.g., financial resource consumption, etc.).

Exemplary Travel Services System with Transportation System

Referring to FIG. 1, a block diagram of an exemplary travel services computer system, shown as travel services system 100, is shown, according to some embodiments. The travel services system 100 may include a transportation computer system, shown as transportation system 102, a user device 110 having a user interface 112, and at least one transportation modality, shown as transportation modalities 120. The travel services system 100 may also include a third-party system 130 having a third-party application 132, a provider system 140 having a provider application 142, and a computing system 150. The travel services system 100 may also include a storage system 160 having a database 162. The components of the travel services system 100 may be connected, or in wired or wireless communication, via a network 170. It should be noted that the number and type of components shown is merely illustrative and, in some embodiments, implementations of the travel services system 100 may have additional, fewer, and/or different components than those illustrated in FIG. 1, including those mentioned elsewhere herein.

As will be discussed in greater detail below, the transportation system 102 may be configured to generate and/or provide (such as visually or audibly via one or more computing devices) one or more transportation recommendations. For example, the transportation system 102 may be configured to receive a transportation request (e.g., a request to travel to a select location, a request to travel to a frequently visited location, etc.). The transportation system 102 may identify (e.g., using the transportation request) a first geographic location and a second geographic location associated with the transportation request. For example, the transportation system 102 may receive a transportation request associated with a user traveling to work. The transportation system 102 may identify a first geographic location (e.g., a user's home or apartment, etc.) and a second geographic location (e.g., a user's work, a place of business, a coffee shop, etc.) associated with the transportation request.

In some embodiments, the transportation system 102 may receive a transportation request, for example associated with a frequently traveled location, via a computing device or from a user. The transportation system 102 may identify a first geographic location (e.g., a user's home or place of work, etc.) and a second geographic location (e.g., a child's school, a daycare facility, a grocery store, etc.), for example a location that is frequently traveled, using the transportation request.

The transportation system 102 may also be configured to determine, using the first geographic location and the second geographic location, a plurality of routes between the first geographic location and the second geographic location. The transportation system 102 may identify one or more of the plurality of routes, for example using available transportation options. For example, the transportation system 102 may identify one or more routes available for travel using a vehicle (e.g., owned or operated by a user, etc.). In some embodiments, the transportation system 102 may identify one or more routes available for travel using public/private transportation (e.g., a bus, train, ride share service, taxi, vehicle, plane, boat, etc.), an alternative mode of transportation (e.g., a bicycle, walking, scooter, etc.), and/or a combination thereof.

For example, the transportation system 102 may identify first a route that involves driving a vehicle to a bus stop and using a bus to travel to the second geographic location, a second route that involves biking to a train station and using a train to travel to the second geographic location, a third route that involves taking a ride share service to a train station and using a train to travel to the second geographic location, etc.

The transportation system 102 may also be configured to identify a plurality of transportation modality options for traveling between the first geographic location and the second geographic location, where each of the plurality of transportation modality options includes at least one transportation modality. The transportation system 102 may identify one or more of the plurality of transportation modality options, for example using a preference (e.g., a user preference, a preference provided by a user or operator, etc.) and/or an available route. For example, the transportation system 102 may identify options for traveling between the first geographic location and the second geographic location that involve using a vehicle (e.g., a hybrid car or a gas-powered pickup truck owned or operated by a user, etc.), a ride share service, a motorcycle, walking or riding a bicycle, taxi, using one or more modes of public and/or private transportation (e.g., a public bus or train, a shuttle or commuter service, etc.).

The transportation system 102 may also be configured to generate a sustainability impact score. The sustainability impact score may indicate an estimated climate impact of using one or more transportation modalities while traveling along one or more associated routes. In some embodiments, the transportation system 102 may be configured to generate a sustainability impact score for each of the plurality of routes (e.g., between the first geographic location and the second geographic location). For example, the transportation system 102 may generate three sustainability impacts scores for three different routes that are available between an individual's home and work using a vehicle (e.g., a vehicle owned or operated by a user). The transportation system 102 may also generate sustainability impact scores for routes that include a combination of transportation options. For example, the transportation system 102 may generate a first sustainability impact score for a route that involves walking to a public transportation station and using a bus to travel to work, and/or a second sustainability impact score for the route that involves taking a ride share to the public transportation station and using a train to travel to work.

The transportation system 102 may also be configured to generate a sustainability impact score for each of the plurality of transportation modality options (e.g., between the first geographic location and the second geographic location). As indicated above, the sustainability impact score may indicate an estimated climate impact of using each of the transportation modality options. For example, the transportation system 102 may generate a sustainability impact score of a user traveling to work using a first vehicle (e.g., a hybrid car, etc.), a second vehicle (e.g., a gas-powered truck, etc.), a motorcycle, a ride share service, a mode of public transportation (e.g., a public bus or train, etc.), an alternative mode of transportation (e.g., biking or walking, etc.), and/or a combination thereof.

The transportation system 102 may also be configured to generate a sustainability impact score for each combination of the plurality of routes and the plurality of transportation modality options. For example, the transportation system 102 may generate a sustainability impact score for a user traveling to work along backroads during an off-time using a first vehicle (e.g., a hybrid card), a sustainability impact score for a user traveling to work along a congested highway during rush hour using a second vehicle (e.g., a gas-powered truck), a sustainability impact score for a user traveling to work by biking to a bus station and using a bus to commute to work, a sustainability impact score for a user traveling to work using a ride share service to a train station and using a train to commute to work, and/or any other suitable combinations of routes and/or modalities described herein.

In some embodiments, the transportation system 102 may be configured to select a transportation recommendation. For example, the transportation system 102 may be configured to select a recommended route from the plurality of routes using the sustainability impact scores of the plurality of routes. The transportation system 102 may also be configured to select a recommended transportation modality option from the plurality of transportation modality options using the sustainability impact scores of the plurality of transportation modality options. In some embodiments, the recommended route and/or the recommended transportation modality may be selected based upon an associated sustainability impact score indicating a lowest estimated climate impact (e.g., compared to the estimated climate impact of the plurality of routes and/or plurality of transportation modality options). For example, the transportation system 102 may recommend a user travel to work by biking to a train station and using a train to get to work, compared to using a ride share service to travel to a bus stop and using a bus to commute to work, using a vehicle (e.g., a gas-powered truck) to travel along a high traffic freeway all the way to work, and/or another suitable combination of routes and/or modalities.

In some embodiments, the recommended route and/or the recommended transportation modality may be selected based upon a user preference (e.g., a preference to avoid traveling in traffic, a preference to use public transportation, a weighing factor between an available modality and an available route, a weighting factor between estimated climate impact and travel efficiency, etc.).

In various embodiments, the transportation system 102 may be configured to generate a user interface providing the transportation recommendation. For example, the transportation system 102 may generate a user interface providing the recommended route and/or the recommended transportation modality option.

The transportation system 102 may provide the transportation recommendation with one or more indicators. For example, the transportation system 102 may provide the transportation recommendation with an estimated climate impact of using the recommended route and/or transportation modality; an estimated energy and/or fuel savings of using the recommended route and/or transportation modality; an estimated emissions of using the recommended route and/or transportation modality; and/or other suitable sustainability impact metrics.

In some embodiments, the transportation system 102 may provide the transportation recommendation with one or more policy parameters (e.g., an insurance policy parameter, etc.). For example, the transportation system 102 may provide the recommended route and/or the recommended transportation modality option with an available coverage option along the recommended route and/or along with the recommended transportation modality; an estimated cost of coverage of the transportation recommendation (e.g., along the route, with the transportation modality, etc.); a discount or other cost-saving associated with traveling along the recommended route and/or using the recommended transportation modality (e.g., a climate impact discount, a fuel efficiency discount, an eco-friendly or electronic vehicle travel discount, a consistent and/or safe traveling speed discount, a safe driving discount, a travel congestion reduction (e.g., reduce left turns, reduce traffic, reduce stops/starts, etc.) discount, etc.), and/or an indicator associated with another suitable parameter (e.g., a sustainability impact or fuel efficiency rating associated with a recommended route and/or transportation modality, a user or operator score or rating associated with the recommended route and/or transportation modality, etc.).

In some embodiments, the recommended route and/or the recommended transportation modality (or mode) option is/are one of a plurality of recommended routes and/or a plurality of recommended transportation modality options. The transportation system 102 may generate the user interface providing the plurality of recommended routes and/or the plurality of recommended transportation modality options. For example, the transportation system 102 may generate a user interface that includes three recommended routes and/or transportation modality options.

As described herein, each of the recommended routes and/or transportation modality options may include one or more indicators associated with the routes/transportation modality options. For example, each of the plurality of recommended routes/transportation modality options may include (1) a sustainability impact indicator (e.g., a climate impact rating, a fuel efficiency rating, an emissions rating, a pollution rating, etc.); (2) a travel information indicator (e.g., a traffic rating, a travel safety indicator, a cost indicator, etc.); (3) a travel efficiency indicator (e.g. an estimated or predicted travel time associated with each route/transportation modality option, etc.); (4) a policy parameter indicator (e.g., an available coverage option, a cost of coverage, a discount or other insurance-cost saving associated with the route/modality options, etc.); and/or (5) another suitable indicator and/or combination thereof.

The transportation system 102 may also be configured to receive a selection of one of the plurality of recommended routes and/or the plurality of recommended transportation modality options. Further, the transportation system 102 may provide at least one policy parameter associated with the selected route and/or selected transportation modality option, as described herein.

Referring still to FIG. 1, according to some embodiments, the transportation system 102 may be configured to communicate with components of the travel services system 100. For example, information and/or data associated with the user device 110 and/or the transportation modalities 120 may be communicated to the transportation system 102 (e.g., via the network 170). Information and/or data associated with the third-party system 130 and/or the provider system 140 may also be communicated to the transportation system 102 (e.g., via the network 170). Information and/or data associated with the computing system 150 and/or the storage system 160 may also be communicated to the transportation system 102 (e.g., via the network 170).

In some embodiments, the transportation system 102 may be implemented using cloud computing services. The transportation system 102 may be implemented using one or more computing devices, for example operating alone and/or or in combination. In some embodiments, the transportation system 102 may be implemented using computing architectures like multiple distributed servers, and/or similar computing devices and/or systems. In some embodiments, the transportation system 102 may be another suitable computing system, for example distributed across multiple systems or devices (e.g., which may be located within a single building or facility, or distributed across multiple different buildings or facilities), or within a single computer (e.g., one server, housing, etc.). All such implementations are contemplated herein.

As shown, the transportation system 102 may be configured to communicate with the user device 110. The user device 110 may include one or more human-machine interfaces or client interfaces, shown as user interface 112 (e.g., a graphical user interface, a text-based computer interface, a client-facing web service, a web service that provides pages to a web client, etc.), for example for controlling, viewing, and/or otherwise interfacing with the transportation system 102. The user device 110 may include a personal mobile computing device (e.g., a smart phone, a tablet, a mobile device, a wearable, smart glasses, a smart watch, etc.). The user device 110 may include a computer workstation, a client terminal, a remote or local interface, and/or any other user interface device. The user device 110 may be a stationary terminal (e.g., a desktop computer, a laptop computer, a tablet, or another suitable non-mobile device).

In some embodiments, information/data associated with the user device 110 may be communicated to the transportation system 102. In some embodiments, the user device 110 itself may be configured to communicate information/data to the transportation system 102. In some embodiments, a device coupled to the user device 110, a component implemented with the user device 110, an application or program housed and/or executed on the user device 110, and/or another suitable component associated with the user device 110 may be configured to communicate information/data to the transportation system 102.

In some embodiments, the transportation system 102 may be configured to receive a transportation request (e.g., associated with the user device 110). For example, the user device 110 (e.g., in response to an input from a user or operator, etc.) may communicate a transportation request to the transportation system 102. The transportation request may identify a geographic location, for example a geographic location a user or operator desires to travel to or from. For example, the transportation request may identify a location of a gathering a user desires to attend, or a location of a grocery store that a user frequently visits.

In some embodiments, the transportation request may identify a plurality of geographic locations. For example, the transportation request may identify a first geographic location (e.g., a location a user desires to travel from, for example their home); a second geographic location (e.g., a location a user desires to travel to, for example work); and/or an additional geographic location, for example a location a user or operator desires to avoid (e.g., due to construction, an accident, inclement weather conditions, etc.), a location a user or operator desires to stop (e.g., a grocery store to run an errand, a school or daycare to pick up a child, a hospital or care giving facility to visit a relative, etc.), a location a user or operator desires to travel through or visit (e.g., a seasonal landmark, a sightseeing event, etc.), and/or another suitable location.

In some embodiments, the transportation request may include additional information (e.g., a time associated with initiation of the transportation request, a time associated with a communication of the transportation request, a device identifier associated with a device that initiates and/or communicates the transportation request, an application/user identifier associated with a user or operator of an application that initiates and/or communicates the transportation request, etc.).

The transportation request may also include a preference. For example, the transportation request may include a travel preference (e.g., for example a preferred departure time, total travel time, a preferred travel route, etc.). The transportation request may also include a preferred type of transportation (e.g., ride share vehicle, bicycle, bus, etc.) and/or other similar transportation related preferences and/or aversions. The transportation request may also include a sustainability impact preference, for example a preference to minimize/reduce an estimated climate impact associated with a travel event (e.g., a route or transportation modality, etc.).

In some embodiments, the transportation request may include a preference to minimize/reduce travel time associated with a travel event, a preference to minimize/reduce exposure to potential safety hazards associated with a travel event, and/or other similar preferences (e.g., a preference to avoid high traffic areas, areas with construction, areas with road or lane closures, areas with emergency or weather-related events, etc.). In some embodiments, the user device 110 may also be configured to store and/or provide (e.g., to the transportation system 102) historical data associated with transportation requests and/or preferences, for example to identify trends or tendencies (e.g., common, or repeated locations, routes, travel times, preferences, etc.) associated with a user or operator.

The transportation system 102 may also be configured to receive information/data associated with the user device 110. For example, the user device 110 may (e.g., automatically, or in response to an input from a user or operator, etc.) communicate geolocation and/or vehicle telematics data (for instance, vehicle telematics data may include acceleration, braking, cornering, location, heading, speed, GPS, and/or other driving data) associated with the user device 110 to the transportation system 102. For example, the user device 110 may communicate information associated with a location of the user device 110, a speed and/or direction of movement of the user device 110, a starting/ending location of the user device 110 during a travel event, and/or other similar geolocation and/or telematics data. The user device 110 may communicate real-time and/or historic geolocation and/or telematics data associated with the user device 110 to the transportation system 102.

In some embodiments, a user or operator may opt-in to sharing geolocation and/or telematics data with the transportation system 102, such that the user device 110 communicates geolocation and/or telematics data to the transportation system 102 at predetermined times (e.g., hourly, daily, weekly, etc.), in predetermined locations (e.g., in an identified geofenced location, for example when "at home" or "at work," etc.), during use of predetermined applications, services, and/or interfaces associated with the user device 110 (e.g., a navigation/map application, a transportation or rental application, etc.), and/or other similar scenarios.

The transportation system 102 may also be configured to receive information/data associated with a user or operator associated with the user device 110. For example, the user device 110 may (e.g., automatically, or in response to an input from a user or operator, etc.) be configured to communicate information associated with a user or operator associated with one or more applications (e.g., housed or executed on the user device 110). In some embodiments, the user device 110 may communicate transportation or travel information associated with a user or operator, for example from a travel application (e.g., associated with public transportation, a private transportation provider, etc.), a rideshare application, a rental application (e.g., associated a vehicle, bike, scooter, etc. rental entity), and/or similar travel applications.

The user device 110 may be configured to communicate information associated with trends or tendencies of a user or operator. For example, the user device 110 may communicate a rating (e.g., a ride share rating, a driver rating, etc.), tendencies of a user or operator to comply with rules or regulations while traveling (e.g., ride share or rental rules, for example traveling within designated areas and/or returning rental vehicles to designated areas, driving rules, etc.), and/or other tendencies or trends of a user or operator while traveling (e.g., a level of engagement with the user device 110, a level of engagement with a microphone or camera of the user device 110, use of maps or other direction-related applications, etc.).

The transportation system 102 may also be configured to receive information associated with a product or service associated with a user or operator of the user device 110. For example, the user device 110 may (e.g., automatically, or in response to an input from a user or operator, etc.) communicate information relating to a vehicle associated with the user or operator (e.g., year, make, model, electric power capabilities, availability of autonomous driving, etc.). The user device 110 may communicate information relating to the health, safety, or wellness associated with a user or operator (e.g., from a health or fitness application, from a safety or crime prevention related application, etc.). According to some embodiments, the user device 110 may be configured to communicate historic information/data associated with a user or operator to the transportation system 102, as well as information in real-time.

The transportation system 102 may also be configured to receive data or information gathered and/or captured by the user device 110. For example, the user device 110 may include a microphone or camera (e.g., for capturing audiovisual information). The user device 110 may capture (e.g., automatically, and/or in response to an input by a user or operator) audiovisual data around the user device 110, for example while a user or operator is in transit. The user device 110 may communicate the audiovisual information to the transportation system 102. In some embodiments, the user device 110 may be configured to communicate audiovisual information (e.g., voice memos, voicemails, images, videos, etc.) stored on the user device 110 to the transportation system 102.

As shown, information/data associated with the transportation modalities 120 may be communicated to the transportation system 102. In some embodiments, the transportation modalities 120 may be configured to communicate information/data to the transportation system 102. In some embodiments, a device coupled to, a system or device monitoring a transportation modality, a device obtaining data from and/or regarding a modality, and/or another suitable system or device associated with a modality may be configured to communicate information/data to the transportation system 102. In some embodiments, the transportation modalities 120 may include at least one transportation modality or mode (e.g., also referred to herein as a transportation modality 120).

The transportation modality 120 may include a bicycle, a scooter, public or private transportation (e.g., bus, train, trolley, tram, coaches, metro, light rail, monorail, rapid rails, subway, etc.), a vehicle, a micromobility vehicle (e.g., a lightweight transportation vehicle, for example a bicycle or scooter, an electronic transportation vehicle, a vehicle used for short-term or short-trip travel, a vehicle that travels below a predetermined speed, for example 10, 15, or 20 miles per hour, etc.), a shared vehicle, an airplane, and/or another suitable form of transportation (e.g., a boat, ferry, taxi, gondola, etc.). Further, the transportation modality 120 may include various alternative forms of transportation, for example walking, running, rollerblading, skateboarding, ice skating, skiing, or other alternative forms of transportation.

In some embodiments, the transportation system 102 may be configured to receive information/data associated with the transportation modality 120. For example, the transportation system 102 may receive geolocation and/or telematics data associated with the transportation modality 120. In some embodiments, the transportation system 102 may be configured to receive transportation related metrics associated with the transportation modality 120 (e.g., a bus, train, airplane, etc.). For example, the transportation system 102 may receive fuel efficiency characteristics, emissions information, maintenance information, electrical or ecological efficiency characteristics, and/or other suitable information associated with the transportation modality 120, which may be used to assess a sustainability impact (e.g., climate impact, etc.) of the transportation modality 120.

In some embodiments, the transportation system 102 may be configured to receive historic transportation related information associated with the transportation modality 120. For example, the transportation system 102 may receive information relating to historic travel times, travel locations/destinations, trip efficiency, average number of turns during a travel event, average number of stops during a travel event, average number of detours or course changes during a travel event, fuel efficiency (e.g., average fuel efficiency) data, travel speed (e.g., average speed) data, and/or other suitable transportation related information associated with the transportation modality 120.

In some embodiments, the transportation related metrics and/or historic transportation information may be used to assess or analyze a sustainability impact (e.g., climate impact) of a particular transportation modality (e.g., the transportation modality 120) operating under specific conditions and/or in specific environments (e.g., travel scenarios, etc.). Additionally or alternatively, the transportation system 102 may be configured to receive audiovisual information (e.g., images, videos, audio recordings, sensor data, etc.) associated with the transportation modality 120. The audiovisual information may be used to assess the transportation modality 120 (and/or associated users or operators, etc.), for example to verify transportation related metrics or trends (e.g., number of turns, average speed, etc.); user or operator characteristics or tendencies (e.g., ratings, tendencies to comply with travel regulations, safety standards, etc.); and/or other suitable transportation information.

In some embodiments, the transportation modality 120 may be or be associated with a vehicle. The vehicle may be owned and/or operated by one or more vehicle users (e.g., a user or operator associated with the user device 110). The vehicle may be any kind of vehicle, including cars, trucks, user-driven or user operated vehicles, self-driving vehicles, autonomous vehicles, semi-autonomous vehicles, motorcycles, recreational vehicles (RVs), all-terrain vehicles (ATVs), snowmobiles, boats, flying taxis, planes, and/or other similar personal mobility vehicles.

As discussed herein, the transportation system 102 may be configured to receive information/data associated with the transportation modality 120 (e.g., the vehicle). For example, the transportation system 102 may receive geolocation and/or telematics data associated with the transportation modality 120 (e.g., historic data, data in real-time, etc. associated with the vehicle). The transportation system 102 may receive transportation related metrics associated with the transportation modality 120 (e.g., travel times, travel locations/destinations, trip efficiency, average number of stops and/or turns, etc.), for example historical transportation metrics and/or information in real-time.

In some embodiments, the transportation system 102 may be configured to receive audiovisual information (e.g., images, videos, audio recordings, sensor data, other data, etc.) captured by the transportation modality 120 and/or a device associated with or monitoring the transportation modality 120 (e.g., the user device 110), for example to assess and/or verify the various transportation related metrics described herein.

The transportation system 102 may receive vehicle related metrics associated with the transportation modality 120 (e.g., automatically, and/or in response to an input). For example, the transportation system 102 may receive information relating to the year, make, model, mileage/usage, fuel efficiency, maintenance characteristics (e.g., filter changes, emissions maintenance/testing, oil changes, tire rotations, etc.), and/or driving characteristics (e.g., self-driving, user driven, etc.) associated with the transportation modality 120 (e.g., the vehicle). The vehicle information may include additional and/or alternative vehicle characteristics associated with the transportation modality 120 (e.g., whether the vehicle includes sensors or alarms, anti-lock braking, traction control, electronic stability control, acceleration slip regulation, cruise control, autonomous cruise control, lane-keep assist systems, driver monitoring systems, adaptive headlamp control, collision avoidance systems, parking assist systems, blind spot monitoring, navigation systems, etc.). In some embodiments, the transportation system 102 may be configured to receive historic vehicle related information associated with the transportation modality 120, as well as information in real-time.

As shown, the transportation system 102 may be configured to receive information/data associated with the third-party system 130. The third-party system 130 may include a third-party application 132. While the travel services system 100 is shown to include one third-party system 130, it is contemplated herein that the travel services system 100 may include a plurality of third-party systems 130. In some embodiments, the transportation system 102 may be configured to receive transportation and/or travel related information/data associated with the third-party system 130. Additionally or alternatively, the transportation system 102 may be configured to receive environmental (e.g., weather, etc.), social (e.g., crime, etc.), and/or ecological information associated with the third-party system 130.

In some embodiments, the third-party system 130 may be associated with a transportation or navigation entity. For example, the third-party system 130 may be associated with a navigation and/or map application. The transportation system 102 may (e.g., automatically, and/or in response to an input from a user or operator) receive navigation and/or map information associated with the third-party system 130. For example, the transportation system 102 may receive map and/or navigation information, including street names, roads/crossroad layouts, traffic density indicators, accident and/or construction notifications, express lane indicators, high occupancy vehicle lane indicators (e.g., a lane for vehicles with multiple occupants, etc.), and/or other suitable map and/or navigation information.

In some embodiments, the transportation system 102 may be configured to receive historic information associated with the navigation information, for example historic traffic and/or accident trends along associated roads and/or at intersections, historic travel speeds or times along associated roads (e.g., including trends associated with reduced/increased speeds, occurrences of stops/starts, etc.), and/or other historic navigation related information.

In some embodiments, the third-party system 130 may be associated with a public entity. For example, the third-party system 130 may be associated with a city, a town, a village, a municipality, and/or another suitable government entity. The transportation system 102 may be configured to receive map and/or navigation information associated with the third-party system 130. For example, the transportation system 102 may receive information including land plots (e.g., including streets, trails, paths, sidewalks, alternative access options (e.g., ramps, curb cuts, etc.), train tracks, ferry lines, etc.), street names, roads/crossroad layouts, intersection control/monitoring information, express lane indicators, high occupancy vehicle lane locations, and/or other suitable map and/or navigation related information associated with the third-party system 130 (e.g., the city, town, village, municipality, etc.).

In some embodiments, the third-party system 130 may be associated with a public transportation entity. The transportation system 102 may be configured to receive transportation and/or travel related information associated with the third-party system 130. For example, the transportation system 102 may receive transportation times/routes associated with one or more transportation modalities (e.g., bus timetables/routes, train timetables/routes, subway timetables/routes, etc.), fuel efficiency and/or energy consumption information (e.g., along the associated routes, etc.), predicted and/or estimated travel times (e.g., along an associated route, etc.), and/or other suitable transportation information.

In some embodiments, the transportation system 102 may be configured to receive historic transportation and/or travel related information, for example historic information relating to fuel efficiency/energy consumption, travel times (e.g., including speeds, stop/start, etc. along associated routes), and/or any other suitable historic transportation and/or travel related information (e.g., route delays, route cancellations, route changes, etc.) associated with the third-party system 130.

In various embodiments, the third-party system 130 may be associated with a private entity. For example, the third-party system 130 may be associated with a private transportation entity. The transportation system 102 may receive transportation and/or travel related information associated with the third-party system 130. For example, the transportation system 102 may receive transportation times/routes associated with one or more transportation modalities (e.g., airplane timetables/routes, shuttle timetables/routes, taxi timetables/routes, etc.), fuel efficiency and/or energy consumption information (e.g., associated with the modality and/or a route, etc.), predicted and/or estimated travel times, and/or other suitable transportation information.

In certain embodiments, the transportation system 102 may be configured to receive historic transportation and/or travel related information associated with the third-party system 130, for example historic information relating to fuel efficiency/energy consumption, travel times (e.g., including delays, cancellations, route changes, etc.), and/or other suitable historic transportation and/or travel information described herein.

In some embodiments, the third-party system 130 may be associated with a transportation network company. For example, the third-party system 130 may be associated with a transportation network company that provides a transportation service, such as a ride-share service and/or a transportation rental service (e.g., bike, scooter, vehicle, etc.). The transportation system 102 may receive transportation and/or travel related information associated with the third-party system 130. For example, the transportation system 102 may receive information associated with trip/travel frequency in one or more geographic locations, times/routes associated with a geographic location, fuel efficiency and/or energy consumption information associated with trips within a geographic location, and/or other related information.

The transportation system 102 may also receive information associated with one or more users or operators, for example a rider or driver rating, tendencies or trends of a user or operator to comply with rules or regulations while traveling (e.g., ride share or rental rules, for example traveling within designated areas and/or returning rental vehicles to designated areas, driving rules, etc.), and/or other information associated with a user or operator. In some embodiments, the transportation system 102 may be configured to receive historic information, as well as information in real-time, and/or other types of data, including sensor data and data from the type of electronic components discussed elsewhere herein.

As shown, information/data associated with the provider system 140 may be communicated to the transportation system 102. In some embodiments, the provider system 140 may be configured to communicate information/data to the transportation system 102. In some embodiments, a device coupled to, a component implemented with the provider system 140, an application or program housed and/or executed on the provider system 140, and/or another suitable component associated with the provider system 140 may be configured to communicate information/data to the transportation system 102.

The provider system 140 may include a provider application 142. In some embodiments, the provider system 140 may be associated with a company or entity that provides protective services (e.g., insurance, etc.) to a user or operator (e.g., a user or operator associated with the user device 110), a company or service provider (e.g., OEM or a provider associated with the third-party system 130), and/or over one or more products or services (e.g., associated with the transportation modality 120, etc.). In some embodiments, the provider system 140 may include the transportation system 102, as described herein. The provider system 140 may be configured to communicate with the transportation system 102 (and/or the user device 110), for example to provide one or more transportation recommendations and/or policy parameters.

In some embodiments, the transportation system 102 may be configured to receive an insurance policy parameter. The provider system 140 may be configured to provide a policy parameter (e.g., to the transportation system 102, to the user device 110, to other components of the travel services system 100, etc.). A policy parameter may refer to a parameter of one or more insurance products (e.g., coverages, policy terms/limits, premiums, etc.).

In certain embodiments, the policy parameter may be selected, generated, and/or offered, for example to supplement or increase existing coverage or to provide new coverage. In some embodiments, the provider system 140 may be configured to generate a plurality of policy parameters. For example, the provider system 140 may be configured to generate a plurality of policy parameters associated with one or more recommended routes, one or more recommended transportation modalities, and/or a combination of the one or more recommended routes and recommended transportation modalities, as will be described herein.

In various embodiments, the policy parameters may be selected, generated, and/or offered based upon a policy availability and/or policy source, a policy availability location, and/or additional parameters (e.g., a cost, a time over which the policy is available, a product or service over which the policy is available, a destination range or location over which the policy is available, eligibility requirements, ability to group or bundle different policies or parameters, available discounts or rewards associated with a policy or parameter, etc.).

As noted herein, in some embodiments the transportation system 102 may be configured to receive one or more policy parameters associated with one or more recommended routes, one or more recommended transportation modalities, and/or a combination thereof. For example, a policy parameter may be generated (e.g., via the provider system 140) that provides coverage over an individual along a selected and/or recommended route.

A policy parameter may be generated (e.g., via the provider system 140) that provides a coverage over a selected and/or recommended transportation modality along a route. For example, one or more policy parameters may be generated (e.g., via the provider system 140) that provide coverage for an individual traveling from their home to work using a ride share service to a train station, and then using a train to commute to work.

In some embodiments, the one or more policy parameters may be generated using one or more factors associated with a recommended route and/or modality. For example, one or more policy parameters for a route and/or a modality may be generated using a sustainability impact score (e.g., climate impact, etc.), a safety factor (e.g., a by-peril rating, or a rating based upon one or more parameters or factors described herein for each route and/or modality), and/or a combination thereof.

Additionally or alternatively, the one or more policy parameters for a route and/or modality may be generated using a plurality of parameters or factors. For example, a policy parameter (e.g., a policy cost or premium, etc.) may be generated for a route and/or modality option based upon a base policy (e.g., cost, rate, coverage, etc.), a location rating factor (e.g., city, state, urban location, rural location, etc.), a coverage rating (e.g., availability, amount, term, etc. of coverage), a claim rating factor (e.g., based upon historical claim information associated with a route, transportation modality, and/or user or operator, etc.), a modality discount or other cost saving (e.g., a multi-modality discount, an electronic vehicle discount, etc.), a sustainability impact discount (e.g., based upon climate impact, fuel efficiency, emissions measurements, etc. associated with a route and/or transportation modality, etc.) a safety impact discount, a risk rating (e.g., a personal injury risk rating, a liability risk rating, etc. associated with a route, transportation modality, and/or a user or operator, etc.), and/or a combination thereof. The one or more policy parameters may be selected and/or generated, for example to provide a premium discount and/or expanded coverage to routes and/or modalities that are associated with sustainability impact scores that indicate a lower estimated climate impact.

In some embodiments, the policy parameter (e.g., premium, coverage, etc.) may be associated with various forms of coverage of an individual and/or mode of transportation, for example collision coverage, comprehensive coverage, liability coverage, rental and/or travel expense coverage, uninsured and/or underinsured motorist coverage, ride share driver or rider coverage, medical payments coverage, emergency road service coverage, personal injury coverage, incidental injury coverage, micromobility vehicle coverage, and/or other suitable transportation related coverages.

As shown, the transportation system 102 may be configured to communicate with the computing system 150. In some embodiments, the computing system 150 may be a cloud-based computing system, for example to provide digital connections between different computing devices and/or systems (e.g., as described herein). The computing system 150 may be a virtual reality (VR) system or augmented reality (AR) system, for example to provide digital connections between a plurality of metadata sources, where the metadata sources are integrated within the VR system or AR system.

In various embodiments, the computing system 150 may be implemented using one or more computing devices, for example operating alone and/or in combination. In some embodiments, the computing system 150 may be implemented using computing architectures like multiple distributed servers, and/or similar computing devices and/or systems. In some embodiments, the computing system 150 may be a server (e.g., including a processor coupled to a memory), for example to store and/or recall data and applications within the memory. In some embodiments, the computing system 150 may be another suitable computing system, for example distributed across multiple systems or devices (e.g., which may be located within a single building or facility, or distributed across multiple different buildings or facilities), or within a single computer (e.g., one server, housing, etc.). All such implementations are contemplated herein.

As shown, the transportation system 102 may be configured to communicate with the storage system 160 (e.g., having the database 162). In some embodiments, the transportation system 102 communicates with the storage system 160, either directly (e.g., via the network 170) or indirectly (e.g., via the user device 110, the transportation modalities 120, etc.). The storage system 160 may include one or more devices (e.g., RAM, ROM, Flash memory, hard disk storage, etc.) for storing data and/or computer code for implementing and/or facilitating the various processes, layers, and/or circuits described herein. The storage system 160 may be or include volatile memory or non-volatile memory, and may include database components, object code components, script components, and/or any other type of information structure for supporting the various activities and information structures described herein.

In certain embodiments, and as will be discussed in greater detail, the transportation system 102 may also be configured to generate data. For example, the transportation system 102 may include components (e.g., a request compiler, a route and modality analyzer, a score generator, a score analyzer, a recommendation generator, and a database) that obtain, analyze, process, generate, store, and/or communicate data.

In various embodiments, the transportation system 102 may be configured to generate and/or provide one or more transportation recommendations. For example, the transportation system 102 may (i) receive a transportation request; (ii) identify a first geographic location and a second geographic location associated with the transportation request; (iii) identify a plurality of routes and/or transportation modality options for traveling between the first geographic location and the second geographic location; (iv) generate a sustainability impact score for each of the plurality of routes and/or transportation modality options; (v) select a recommended route (e.g., of the plurality of routes) and/or a recommended transportation modality option (e.g., from the plurality of transportation modality options); and/or (vi) generate a user interface providing the recommended route and/or the recommended transportation modality option.

Exemplary Transportation Computer System

Figure 2:
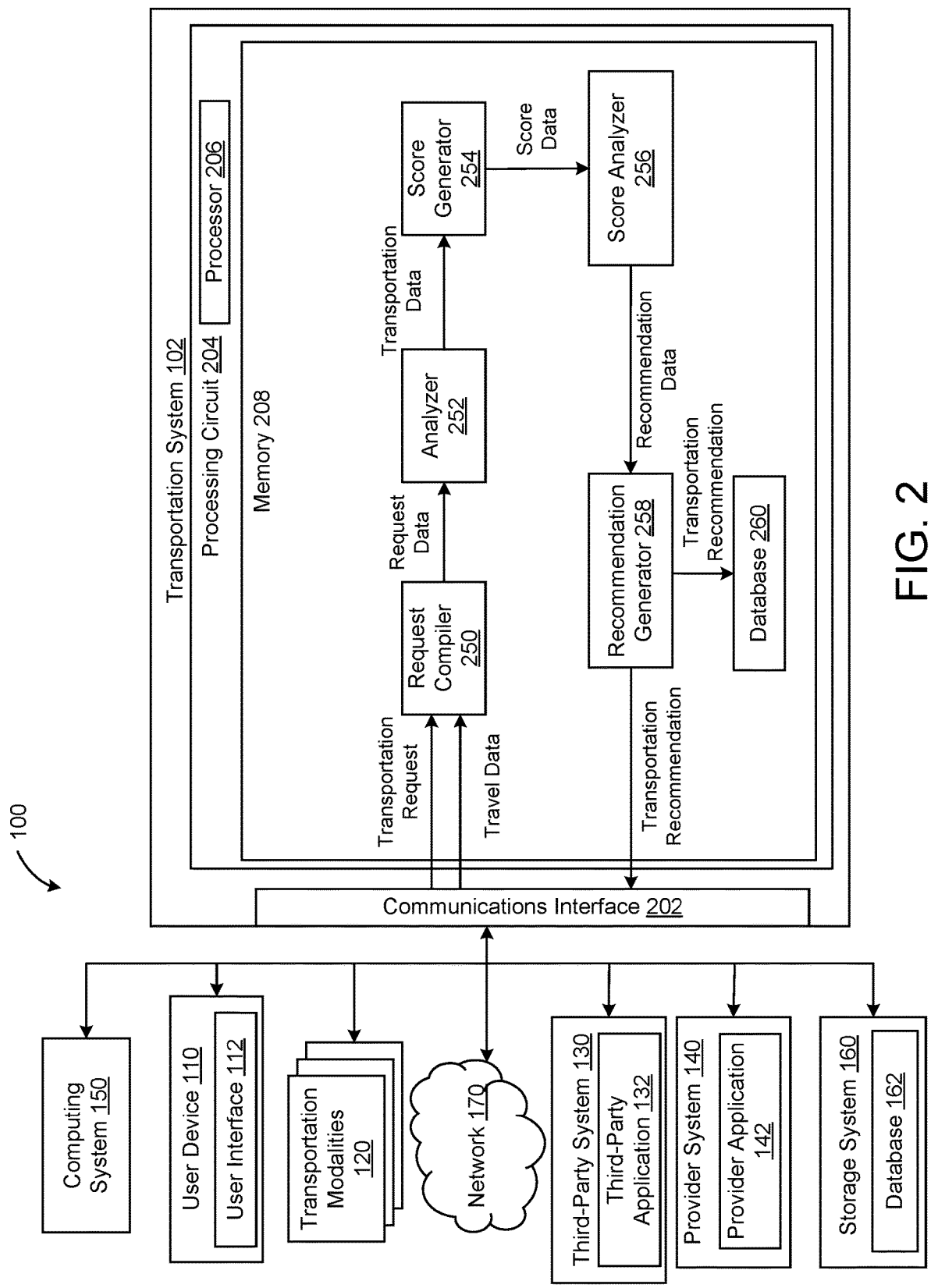
FIG. 2 is a block diagram of an exemplary computer transportation system, according to some embodiments.

Referring now to FIG. 2, a block diagram of the exemplary transportation system, e.g., the transportation system 102, is shown in greater detail, according to some embodiments. As discussed above, the transportation system 102 may be configured to generate and/or provide one or more transportation recommendations. For example, the transportation system 102 may be configured to receive a transportation request and identify a first location geographic location and a second geographic location associated with the transportation request.

In some embodiments, the transportation system 102 may be configured to determine a plurality of routes between the first location and the second location and generate a sustainability impact score for each of the plurality of routes, where the sustainability impact score indicates an estimated climate impact of using one or more transportation modalities while traveling along the associated route. The transportation system 102 may select a recommended route from the plurality of routes using the sustainability impact scores (e.g., by identifying a sustainability impact score indicating a lowest estimated climate impact) and generate a user interface providing the recommended route (or otherwise present the recommended route to a user, such as visually or audibly via one or more computing devices, such as mobile devices, AR glasses, VR headsets, voice bots, chatbots, etc.).

In some embodiments, the transportation system 102 may also be configured to (i) identify a plurality of transportation modality options for traveling between the first geographic location and the second geographic location, and (ii) generate a sustainability impact score for each of the plurality of transportation modality options. The transportation system 102 may (a) select a recommended transportation modality option from the plurality of transportation modality options using the sustainability impact scores (e.g., by identifying a sustainability impact score indicating a lowest estimated climate impact), and/or (b) generate a user interface providing the recommended transportation modality option, or otherwise visually and/or audibly present the recommended transportation modality option to the user, such as via one or more computing devices.

In some embodiments, the transportation system 102 may be configured to (i) select a recommended route from the plurality of routes and a recommended transportation modality option from the plurality of transportation modality options using sustainability impact scores for each combination of the plurality of routes and the plurality of transportation modality options, and/or (ii) generate a user interface providing the recommended route and the recommended transportation modality option, or otherwise visually and/or audibly present the recommended transportation modality option to the user, such as via one or more computing devices.

As shown in FIG. 2, the transportation system 102 may be communicably connected to the user device 110, the transportation modalities 120, the third-party system 130, the provider system 140, the computing system 150, and the storage system 160 (e.g., via the network 170). In some embodiments, the transportation system 102 may be communicably connected to other suitable systems and/or devices (e.g., via the network 170), including those devices mentioned elsewhere herein. It should be understood that some or all of the components of the transportation system 102, the user device 110, the transportation modalities 120, the third-party system 130, the provider system 140, the computing system 150, the storage system 160, and/or the network 170 may be implemented as art of a cloud-based computing system configured to obtain, process, and/or communicate data from one or more external devices or sources.

Similarly, some, or all, of the components of the transportation system 102, the user device 110, the transportation modalities 120, the third-party system 130, the provider system 140, the computing system 150, the storage system 160, and/or the network 170 may be integrated within a single device or be distributed across multiple separate systems or devices. In some embodiments, transportation system 102, the user device 110, the transportation modalities 120, the third-party system 130, the provider system 140, the computing system 150, the storage system 160, and/or the network 170 are components of a controller, a device controller, a field controller, a computer work station, a client device, and/or another system or device that receives, processes, and/or communicates data from/to devices or other data sources.

As shown, the transportation system 102 may include a communications interface 202 and a processing circuit 204 having a processor 206 and a memory 208. The communications interface 202 may include wired or wireless communications interfaces (e.g., jacks, antennas, transmitters, receivers, transceivers, wire terminals, etc.) for communicating data between the transportation system 102 and external systems or devices (e.g., the user device 110, the transportation modalities 120, the third-party system 130, the provider system 140, the computing system 150, the storage system 160, etc.). In some embodiments, the communications interface 202 facilitates communications between the transportation system 102 and one or more external applications and/or interfaces (e.g., the user interface 112, the third-party application 132, the provider application 142 etc.), for example to allow a remote user or operator to control, monitor, and/or adjust components of the transportation system 102.

Further, the communications interface 202 may be configured to communicate with external systems and/or devices using any of a variety of communications protocols (e.g., HTTP(S), WebSocket, CoAP, MQTT, etc.) and/or any of a variety of other protocols. Advantageously, the transportation system 102 may obtain, ingest, and process data from any type of system or device, regardless of the communications protocol used by the system or device.

As shown, the transportation system 102 may include the processing circuit 204 having the processor 206 and the memory 208. While shown as single components, it should be appreciated that the transportation system 102 may include one or more processing circuits, including one or more processors and memory.

In some embodiments, the transportation system 102 may include a plurality of processors, memories, interfaces, and/or other components distributed across multiple devices or systems, which are communicably coupled via a network (e.g., the network 170). For example, in a cloud-based or distributed implementation, the transportation system 102 may include multiple discrete computing devices, each of which include a processor 206, memory 208, communications interface 202, and/or other components of the transportation system 102. Tasks performed by the transportation system 102 may be distributed across multiple systems or devices, which may be located within a single building or facility or distributed across multiple buildings or facilities. In other embodiments, the transportation system 102 itself may be implemented within a single computer (e.g., one server, one housing, etc.). All such implementations are contemplated herein.

The processor 206 may be a general purpose or specific purpose processor, an application specific integrated circuit (ASIC), one or more field programmable gate arrays (FPGAs), a group of processing components, or other suitable processing components. The processor 206 may further be configured to execute computer code or instructions stored in the memory 208 or received from other computer readable media (e.g., USB or other local storage, network storage, a remote server, etc.).

The memory 208 may include one or more devices (e.g., memory units, memory devices, storage devices, etc.) for storing data and/or computer code for completing and/or facilitating the various processes described in the present disclosure. The memory 208 may include random access memory (RAM), read-only memory (ROM), hard drive storage, temporary storage, non-volatile memory, flash memory, optical memory, or any other suitable memory for storing software objects and/or computer instructions. In some embodiments, the memory 208 may include database components, object code components, script components, and/or any other type of information structure for supporting the various activities and information structures described in the present disclosure. The memory 208 may be communicably connected to the processor 206 via the processing circuit 204, and may include computer code for executing (e.g., by the processor 206) one or more processes described herein. When the processor 206 executes instructions stored in the memory 208, the processor 206 may configure the processing circuit 204 to complete such activities.

As shown, the transportation system 102 (e.g., the memory 208) may include a request compiler 250, a route and modality analyzer, shown as an analyzer 252, a score generator 254, a score analyzer 256, a recommendation generator 258, and a database 260. The following paragraphs describe some of the general functions performed by each of the components 250-260 of the transportation system 102. It should be noted that the number and type of components shown is merely illustrative and, in some embodiments, implementations of the transportation system 102 may have additional, fewer, and/or different components than those illustrated in FIG. 2.

In some embodiments, the request compiler 250 may be configured to obtain input data, analyze the input data, and/or generate output data to be communicated to other components of the transportation system 102. For example, the request compiler 250 may obtain (e.g., receive, request, pull, etc.) a transportation request. The transportation request may be received from an external system or device (e.g., an edge device, the user device 110, etc.), for example via the communications interface 202.

In some embodiments, the transportation request identifies a geographic location. For example, the transportation request may identify a geographic location a user or operator desires to travel to/from (e.g., from home, to work, from work, to a school or daycare facility, etc.). In some embodiments, the transportation request identifies a first geographic location and a second geographic location, for example a first geographic location (e.g., point of departure or trip origination point) a user or operator desires to travel from (e.g., home), and a second geographic location (e.g., destination or arrival point) the user or operator desires to travel to (e.g., a location of a gathering).

In various embodiments, the transportation request may identify additional geographic locations. For example, the transportation request may identify a geographic location (e.g., a geofenced location, etc.) a user or operator desires to avoid (e.g., an area under construction, an area where an accident has been identified, a high crime area, an area where inclement weather is predicted to occur or is occurring, etc.), a geographic location a user or operator desires to stop or visit (e.g., a grocery store or gas station, a school or daycare, a hospital or care facility, etc.), a geographic location a user or operator wishes to travel by or through (e.g., a historic landmark, a seasonal sightseeing location, etc.), and/or another suitable geographic location. The transportation request may include additional information (e.g., a time associated with initiation and/or communication of the transportation request, a device, application, and/or user identifier associated with a device or application that initiates and/or communicates the transportation request, etc.).

The transportation request may also identify a preference. For example, the transportation request may include a route preference (e.g., a preference for a route that reduces encountering traffic, reduces stops/starts, avoids a construction event or accident, etc.). The transportation request may include a preferred transportation modality (e.g., a preference to utilize a ride share, a bicycle, a bus, or train, etc.).

In some embodiments, the transportation request may include a sustainability impact preference. For example, the transportation request may include a preference to minimize/reduce an estimated climate impact associated with traveling (e.g., along a route, using a transportation modality, etc.). Additionally or alternatively, the transportation request may include a preference to minimize/reduce travel time along a route, and/or a preference to minimize/reduce exposure to potential safety hazards associated with travel along a route. In certain embodiments, the transportation request may include additional travel and/or transportation information (e.g., historic transportation information associated with a user or operator, an additional preference of a user or operator, etc.).

In some embodiments, the request compiler 250 may be configured to obtain (e.g., receive, request, pull, etc.) travel data. The travel data may be received from an external system or device (e.g., an edge device, the user device 110, the transportation modalities 120, the third-party system 130, the provider system 140, the computing system 150, and/or the storage system 160, etc.), for example via the communications interface 202.

In various embodiments, the travel data may include information associated with a user device (e.g., the user device 110). For example, the travel data may include geolocation and/or telematics data associated with the user device 110 (e.g., a location, a speed or direction of movement, historic geolocation and/or telematics data, geolocation and/or telematics data provided in real-time, etc.).

Additionally or alternatively, the travel data may include information associated with a user or operator of a user device (e.g., the user device 110 or other computing device (s), including those mentioned herein). For example, the travel data may include information from a ride-share application (e.g., a rider rating, a driver rating, historic and/or common trips of a user, etc.), a transportation rental application (e.g., a rental rating, historic and/or common trips of a user, etc.), and/or information associated with another similar travel application (e.g., common trips using public transportation, via a private transportation service, walking, running, biking, or an alternative mode of transportation, etc.).

In some embodiments, the travel data may include information associated with a product or service associated with a user or operator of a user device (e.g., the user device 110 or other computing device(s), including those discussed herein.). For example, the travel data may include information relating to a vehicle associated with a user or operator (e.g., electric power capabilities, maintenance characteristics or history, safety ratings, etc.), and/or transportation characteristics of the vehicle (e.g., a fuel efficiency, emissions, an average travel time or distance, an average number of stops or turns, an average speed of travel, etc.). In certain embodiments, the travel data may include information collected and/or gathered via a user device (e.g., the user device 110). For example, the travel data may include audiovisual information (e.g., captured via a microphone or camera of the user device 110, and/or captured via a mobile device, AR glasses, VR headset, voice bot, chatbot, wearable, or other computing devices, including those mentioned herein), for example audiovisual (including audio, visual, video, image, and/or graphical information, data, and sensor data) information and related data captured in real-time (e.g., during a travel event) and/or historical audiovisual information and related data.

In some embodiments, the travel data may include information associated with a transportation modality (e.g., the transportation modality 120 or transportation mode). In some embodiments, the transportation modality 120 is one of a plurality of transportation modalities 120, such that the travel data may include information associated with a plurality of transportation modalities 120. The travel data may include geolocation and/or telematics data, for example associated with each of the transportation modalities 120. The travel data may include transportation characteristics of each of the transportation modalities 120, for example a fuel efficiency, an emissions measure or characteristic, an electrical or ecological efficiency measurement, and/or other suitable transportation related metrics.

The travel data may also include historic travel information of each of the transportation modalities 120, for example historical information associated with travel times, locations, trip lengths, average number of turns, average number of stops/starts, common departure/end locations, and/or other similar travel related information. In some embodiments, the travel data may include audiovisual information from each of the transportation modalities 120, for example audiovisual information (such as images, videos, audio, verbal, and/or other data or sensor data, including that discussed elsewhere herein) associated with routes, trips, travel events, and/or other transportation related information (e.g., users and/or operators, etc.).

In some embodiments, the travel data may include information associated with a third-party system (e.g., the third-party system 130). In some embodiments, the third-party system 130 is one of a plurality of third-party systems 130, such that the travel data may include information associated with a plurality of third-party systems 130.

For example, the third-party system 130 may be associated with a travel or navigation entity, and the travel data may include navigation and/or map information (e.g., street names, roads and crossroads, trails, sidewalks, bike trails or lanes, traffic indicators, traffic control indicators, accident and/or construction notifications, express or high occupancy vehicle lane indicators, hill or mountain information, elevation information, route contour information, etc.). In some embodiments, the third-party system 130 may be associated with a public entity (e.g., a city or municipality, and/or a public transportation entity).

Additionally or alternatively, the travel data may include map and/or navigation information associated with the public entity (e.g., land plots, including trails, walkways, paths, ferry lanes, street or road names, intersection control or monitoring information, security and/or surveillance information, etc.). The travel data may also include transportation and/or travel related information, for example times/routes associated with public transportation modalities (e.g., bus or train schedules and routes, etc.) and/or other transportation metrics associated with the public transportation modalities (e.g., fuel efficiency, estimated travel times, occurrences of delays or cancellations, historic route changes or alterations, average stops/starts along a route, average number of turns along a route, etc.).

In some embodiments, the third-party system 130 may be associated with a private entity, for example a private transportation entity (e.g., an airline company, a shuttle or private vehicle provider, a taxi, etc.). The travel data may include information associated times/routes associated with the private transportation modalities (e.g., flight or shuttle schedules and routes, etc.) and/or other transportation metrics (e.g., fuel efficiency, estimated travel times, occurrences of delays or cancellations, etc.).

In some embodiments, the third-party system 130 may be associated with a transportation network company. For example, the third-party system 130 may be associated with a company that provides a transportation service, such as a ride-share service and/or a transportation rental service. The travel data may include information associated with trip and/or travel frequency, for example in one or more geographic locations, efficiencies and/or energy consumption associated with travel events (e.g., fuel efficiency, travel times, average number of stops and/or turns, etc.), and/or other suitable travel information. The travel data may further include information associated with one or more users or operators associated with the transportation network company (e.g., a rider or operator rating, information associated with users or operators obeying rules or regulations associated with the company, etc.).

In some embodiments, the travel data may include information associated with a provider system 140. The provider system 140 may be associated with a company that provides protective services (e.g., insurance, etc.) to a user or operator, a company, service provider, and/or one or more products or services. The travel data may include one or more policy parameters associated with one or more users, operators, companies, service providers, products, and/or services. The travel data (e.g., one or more policy parameters) may be provided using historical policy parameter information (e.g., historic policy characteristics, etc.), and/or one or more additional policy parameters (e.g., cost, discounts, availability and/or policy source, a policy availability location, a time over which the policy is available, a product or service over which the policy is available, a destination range or location over which the policy is available, eligibility requirements, ability to group or bundle different policies or parameters, available discounts or rewards associated with a policy or parameter, etc.), as described herein.

In some embodiments, travel data may include information associated with a computing system (e.g., the computing system 150) and/or a storage system (e.g., the storage system 160). The travel data may include historic and/or real-time travel or navigation related information, for example from (e.g., directly, or indirectly) the computing system 150 and/or the storage system 160, as described herein. In some embodiments, travel data may be received by the transportation system 102 in real-time and/or at one or more series or intervals (e.g., hourly, daily, etc., automatically in response to a travel event initiated and/or associated with the user device 110, the transportation modality 120, the third-party system 130, the provider system 140, etc.).

As shown, the request compiler 250 may be configured to obtain input data (e.g., a transportation request, travel data, etc.), analyze the input data, and/or generate output data. For example, the request compiler 250 may be configured to obtain (e.g., receive, request, pull, etc.) a transportation request and/or travel data, analyze (e.g., compile, process, etc.) the data, and generate request data. The request data may be communicated to another component of the transportation system 102 (e.g., the analyzer 252). In certain embodiments, the request data may include data associated with the transportation request and/or travel data, and/or one or more instructions to identify (e.g., generate, determine, etc.) a plurality of transportation options associated with the transportation request, as will be discussed below.

In some embodiments, the analyzer 252 may be configured to obtain input data, analyze the input data, and/or generate output data to be communicated to other components of the transportation system 102. For example, the analyzer 252 may obtain (e.g., receive, request, pull, etc.) request data, analyze the request data, and/or generate transportation data, for example including a plurality of transportation options associated with a transportation request.

As shown, the analyzer 252 may be configured to analyze the request data and generate transportation data. In some embodiments, the transportation data identifies a plurality of routes, for example between the first geographic (or departure) location and the second geographic (or destination or arrival) location. In some embodiments, one or more of the plurality of routes may include an additional location and/or a plurality of locations (e.g., a route between home and a train station, a route between the train station and work, etc.).

In some embodiments, the analyzer 252 may be configured to determine one or more of the plurality of routes using a preference. For example, the analyzer 252 may determine one or more routes using a preferred travel characteristic (e.g., a preference to reduce encountering traffic, reduce stops/starts, reduce left turns, reduce curves, reduce hills, avoid an accident and/or a construction event, etc.). The analyzer 252 may determine one or more routes using a travel impact preference (e.g., reduce an estimated climate impact, a travel time, exposure to potential safety hazards, etc. associated with a route, etc.). In some embodiments, the analyzer 252 may be configured determine one or more routes using a preferred transportation modality (e.g., one or more routes that incorporate use of a ride share, a bicycle, a public bus or train, etc.) and/or an available transportation modality (e.g., a vehicle owned or operated by a user or operator, etc.).

In some embodiments, the analyzer 252 may be configured to determine one or more of the plurality of routes using information associated with a user device (e.g., the user device 110). For example, the analyzer 252 may determine one or more routes using geolocation and/or telematics data associated with the user device 110 (e.g., a current location of the user device 110).

The analyzer 252 may determine one or more of the plurality of routes using information associated with a user or operator of the user device 110 (e.g., a rider or operator rating, common trips of a user or operator, a travel efficiency of the user or operator, etc.), and/or a product or service associated with a user or operator of the user device 110 (e.g., vehicle characteristics, for example fuel efficiency, emissions measurements, historic trips and/or travel events, etc.), as described herein. The analyzer 252 may also determine one or more of the plurality of routes using information obtained (e.g., collected, gathered, etc.) from the user device 110, for example audiovisual information (e.g., images, videos, voice recordings, etc.).

In some embodiments, the analyzer 252 may be configured to determine one or more of the plurality of routes using information associated with a transportation modality (e.g., the transportation modality 120). For example, the analyzer 252 may determine one or more routes using geolocation and/or telematics data associated with at least one of the transportation modalities 120 (e.g., a current location, etc.). The analyzer 252 may determine one or more of the plurality of routes using transportation characteristics (e.g., fuel efficiency, lack of hills, etc.), and/or other historic transportation related metrics (e.g., travel times, trip lengths, departure/destination locations, delays and/or cancellations, etc.), as described herein.

In some embodiments, the analyzer 252 may be configured to determine one or more of the plurality of routes using information associated with a third-party system (e.g., the third-party system 130). For example, the analyzer 252 may determine one or more of the plurality of routes using navigation and/or map information (e.g., associated with a travel or navigation entity, a public entity, etc.), modality transportation timetables (e.g., associated with a public bus or train, a private shuttle or taxi, etc.), and/or other transportation related information (e.g., travel times, trip lengths, departure/destination locations, delays and/or cancellations, etc.), as described herein. The analyzer 252 may also determine one or more routes using information associated with a transportation network company (e.g., a rider or operator rating, common transportation tendencies and/or trends associated with a user or operator, etc.), as described herein.

In some embodiments, the analyzer 252 may be configured to determine one or more of the plurality of routes using information associated with a provider system (e.g., the provider system 140). For example, the analyzer 252 may be configured to determine one or more of the plurality of routes using a policy parameter (e.g., associated with one or more of a user, operator, company, service provider, and/or one or more products or services). In some embodiments, the analyzer 252 may determine one or more of the plurality of routes using historical policy parameter information (e.g., historic policy characteristics, etc.), and/or one or more additional policy parameters (e.g., a cost associated with a policy, availability and/or policy source, a time over which the policy is available, coverage associated with a policy, etc.), as described herein.

Additionally or alternatively, the analyzer 252 may be configured to determine one or more of the plurality of routes using information associated with a computing system (e.g., the computing system 150) and/or a storage system (e.g., the storage system 160). For example, the analyzer 252 may determine one or more of the plurality of routes using historic and/or real-time travel data associated with the storage system 160 and/or the computing system 150.

In various embodiments, the transportation data may identify a plurality of transportation modality options, for example for traveling between the first geographic location and the second geographic location. The plurality of transportation modality options may include at least one transportation modality, for example capable of traveling between the first geographic location and the second geographic location. As described herein, the at least one transportation modality may include a bicycle, a scooter, public or private transportation (e.g., bus, train, trolley, tram, coaches, metro, light rail, monorail, rapid rails, subway, etc.), a vehicle, a shared vehicle, an airplane, and/or another suitable form of transportation (e.g., a boat, ferry, taxi, gondola, etc.). Further, the at least one transportation modality may include various alternative forms of transportation, for example walking, running, rollerblading, skateboarding, ice skating, skiing, and/or other alternative forms of transportation. In some embodiments, the transportation data may identify a plurality of transportation modality options for traveling between additional geographic locations (e.g., options for traveling between home and a public transportation station, for example walking, via a bicycle, using a ride share service, etc., and/or options for traveling between the public transportation station and work, for example via a bus, train, shuttle, etc.).

In some embodiments, the analyzer 252 may be configured to determine a plurality of transportation modality options using a preference. For example, the analyzer 252 may determine a plurality of transportation modality options using a preferred travel characteristic (e.g., reduce encountering traffic, reduce stops/starts, reduce left turns, avoid an accident and/or a construction event, etc.) and/or a travel impact preference (e.g., reduce an estimated climate impact, a travel time, exposure to potential safety hazards, etc. associated with a modality, etc.). In some embodiments, the analyzer 252 may be configured to determine a plurality of transportation modality options using a preferred transportation modality (e.g., use of a ride share, a bicycle, a public bus or train, etc.) and/or an available transportation modality (e.g., a vehicle owned or operated by a user or operator, etc.). In some embodiments, the analyzer 252 may be configured to determine a plurality of transportation modality options using a preferred and/or available route, and/or a travel preference associated with an available route (e.g., a route that reduces traffic, travel time, climate impact, etc.).

In certain embodiments, the analyzer 252 may be configured to determine a plurality of transportation modality options using information associated with a user device (e.g., the user device 110), a transportation modality (e.g., the transportation modality 120), a third-party system (e.g., the third-party system 130), and/or a provider system (e.g., the provider system 140), as described herein. In some embodiments, the analyzer 252 may be configured to determine a plurality of transportation modality options using information associated with a computing system (e.g., the computing system 150) and/or a storage system (e.g., the storage system 160), as described herein.

As shown, the analyzer 252 may be configured to obtain input data (e.g., the request data, etc.), analyze the input data, and/or generate output data. For example, the analyzer 252 may be configured to obtain (e.g., receive, request, pull, etc.) request data (e.g., via the request compiler 250), analyze the request data, and generate transportation data. As described herein, the transportation data may identify a plurality of transportation options, for example a plurality of routes and/or a plurality of transportation modality options. In this regard, the transportation data may identify various combinations of the plurality of routes (e.g., between the first geographic location and the second geographic location) and/or the plurality of transportation modality options (e.g., available along each of the plurality of routes).

In some embodiments, the score generator 254 may be configured to obtain input data, analyze the input data, and/or generate output data to be communicated to other components of the transportation system 102. For example, the score generator 254 may obtain (e.g., receive, request, pull, etc.) transportation data, analyze the transportation data, and/or generate score data, for example including a plurality of scores (e.g., associated with transportation options) associated with the transportation request.

Additionally or alternatively, the score generator 254 may be configured to generate a score for each of the plurality of routes. The score may be a sustainability impact score, for example indicating an estimated climate impact of using at least one transportation modality along the associated route. As described herein, "sustainability impact score" may represent an estimated (e.g., overall) climate impact of a mode/method/route of travel, or an amount of pollution or carbon emissions generated by the mode/method/route of travel. In some embodiments, the sustainability impact score may consider factors such as, but not limited to, vehicle characteristics (e.g., fuel efficiency, emissions levels, electrical or ecological characteristics of component parts, etc.), user or operator travel tendencies (e.g., tendency to speed, make frequent stops/starts, accelerate/decelerate quickly, etc.), and/or route characteristics (e.g., frequently includes traffic, includes construction, involves several stops/starts, etc.).

As an illustrative example, the score generator 254 may be configured to generate sustainability impact scores for three different routes that are available for traveling between an individual's home and work using a vehicle. For example, the score generator 254 may generate (1) a first sustainability impact score for a first available route that only uses sideroads (e.g., estimated based upon an estimated emissions and/or fuel consumption associated with driving a vehicle along the first route); (2) a second sustainability impact score for a second available route that involves traveling on a highway (e.g., estimated based upon an estimated emissions and/or fuel consumption associated with driving the vehicle along the second route); and/or (3) a third sustainability impact score for a third available route that involves using an express lane on the freeway (e.g., estimated based upon an estimated emissions and/or fuel consumption associated with driving the vehicle along the third route).

As described herein, a sustainability impact score may be calculated and/or generated using one or more rules, algorithms, and/or models. For example, the score generator 254 may be configured to generate a sustainability impact score using one or more rules and/or rule-based logic. For example, the rules may be used to estimate a carbon emission and/or another sustainability metric (e.g., fuel efficiency, etc.) of different transportation modalities (e.g., a hybrid vehicle, a public bus, a high-speed train, etc.) during different transportation scenarios (e.g., at various speeds, during acceleration/deceleration events, during turns, in various locations, etc.) along different routes. The rules and/or rule-logic may be used along with historical transportation related data (e.g., carbon emissions and/or fuel efficiency of a transportation modality, for example a hybrid car, a high-speed train, etc., carbon emissions and/or fuel efficiency along various travel routes, in various locations, at various times, etc.).

In various embodiments, the score generator 254 may be configured to use the historical transportation data to train a predictive model, for example to establish correlations between a sustainability metric (e.g., carbon emission, fuel efficiency, etc.) and one or more transportation modalities and/or travel locations (e.g., routes, etc.). In some embodiments, the score generator 254 may include one or more models and/or artificial intelligence models. For example, the score generator 254 may include one or more regression trees, deep neural networks, supervised learning model, unsupervised learning models, nearest neighbor, generative adversarial (GANs), stable diffusers, generative artificial intelligence (GAI), transformers, or many other types of models.

In some embodiments, the machine learning models and/or artificial intelligence models may be trained to detect correlations between a sustainability metric (e.g., carbon emission, fuel efficiency, etc.) and a transportation modality, a travel route, a user and/or operator (e.g., of the transportation modality, etc.), and/or other transportation related parameters.

In some embodiments, the score generator 254 may be configured to generate a score for each of the plurality of modality options. For example, the score may be a sustainability impact score indicating an estimated climate impact of using a transportation modality option (e.g., to travel between the first geographic location and the second geographic location).

Additionally or alternatively, the score generator 254 may be configured to generate sustainability impact scores for three different combinations of modalities for traveling along a route between an individual's home and work. For instance, the score generator 254 may generate (i) a first sustainability impact score along a route that involves an individual walking to a public transportation station and taking a bus to work (e.g., estimated based upon an estimated emissions and/or fuel consumption associated with walking and taking the bus); (ii) a second sustainability impact score along the route that involves the individual biking to the public transportation station and taking a train to work (e.g., estimated based upon an estimated emissions and/or fuel consumption associated with biking and taking the train); and/or (iii) a third sustainability impact score along the route that involves the individual taking a ride share service to the public transportation station and taking the bus to work (e.g., estimated based upon an estimated emissions and/or fuel consumption associated with taking the ride share and the bus). Other combinations may be generated or otherwise utilized.

In various embodiments, the score generator 254 may be configured to generate a score for each combination of the plurality of routes and the plurality of transportation modality options. In this regard, the scores may be sustainability impact scores indicating an estimated climate impact of using one or more of the plurality of transportation modality options along each of the plurality of routes. For example, the score generator 254 may generate (i) a first sustainability impact score along a first route that involves an individual driving to work (e.g., estimated based upon an estimated emissions and/or fuel consumption associated with driving the vehicle); (ii) a second sustainability impact score along a second route that involves the individual taking a ride share to a public transportation station and taking a train to work (e.g., estimated based upon an estimated emissions and/or fuel consumption associated with taking the ride share and taking the train); and/or (iii) a third sustainability impact score along a third route that involves the individual taking their vehicle to a shuttle stop and taking the shuttle to work (e.g., estimated based upon an estimated emissions and/or fuel consumption associated with taking the ride share and taking the shuttle). Other combinations may be generated or otherwise utilized.

Additionally or alternatively, the score generator 254 may be configured to generate a score for each of the plurality of routes and/or the plurality of transportation modality options (and/or combinations thereof) using a preference. For example, the score generator 254 may generate one or more scores using a preferred route (e.g., or a portion thereof, etc.) and/or a preferred transportation modality (e.g., a preference to use a bicycle or ride share, a vehicle owned or operated by a user, a public bus or train, etc.). In some embodiments, the score generator 254 may generate one or more scores using a weight factor or rating (e.g., one or more weighting factors between an estimated climate impact, travel time, and/or travel safety, etc.).

In certain embodiments, the score generator 254 may be configured to generate a score that indicates an estimated travel time associated with the plurality of routes and/or the plurality of transportation modality options (and/or combinations thereof). In some embodiments, the score may indicate a safety rating (e.g., a level of exposure to a potential safety hazard) associated with the plurality of routes and/or the plurality of transportation modality options (and/or combinations thereof). Additionally or alternatively, the score generator 254 may be configured to generate one or more scores using a policy parameter (e.g., a coverage, policies, discounts, etc.), for example associated with the plurality of routes and/or the plurality of transportation modality options (and/or combinations thereof).

As shown, the score generator 254 may be configured to obtain input data (e.g., the transportation data, etc.), analyze the input data, and/or generate output data. For example, the score generator 254 may be configured to obtain (e.g., receive, request, pull, etc.) transportation data (e.g., via the analyzer 252), analyze the transportation data, and generate score data. As described herein, the score data may include a score for each of the plurality of routes and/or the plurality of transportation modality options (and/or combinations thereof). In this regard, the score generator 254 may be configured to generate score data that indicates an estimated climate impact (or carbon emission generation) of using one or more of a plurality of transportation modality or mode options along a plurality of routes.

In some embodiments, the score analyzer 256 may be configured to obtain input data, analyze the input data, and/or generate output data to be communicated to other components of the transportation system 102. For example, the score analyzer 256 may obtain (e.g., receive, request, pull, etc.) score data, analyze the score data, and/or generate recommendation data, for example identifying one or more recommended transportation options associated with the transportation request.

Additionally or alternatively, the score analyzer 256 may be configured to analyze (e.g., compile, categorize, sort, etc.) the score data. For example, the score analyzer 256 may analyze score data associated with each of the plurality of routes. The score analyzer 256 may analyze the score data to identify a sustainability impact score (e.g., associated with a route) indicating a lowest estimated climate impact (e.g., relative to the estimated climate impact scores of the plurality of routes) or lowest pollution or carbon emission generation for a mode or route. In some embodiments, the score analyzer 256 may analyze (e.g., compiles, categorizes, etc.) the score data to identify a hierarchy of sustainability impact scores (e.g., indicating a lowest to highest estimated climate impact (or carbon emission generation) of the plurality of routes).

The score analyzer 256 may analyze the score data associated with the plurality of transportation modality options. Additionally or alternatively, the score analyzer 256 may analyze the score data to identify a sustainability impact score (e.g., associated with a transportation modality) indicating a lowest estimated climate impact (e.g., relative to the estimated climate impact scores of the plurality of transportation modality options) and/or a lowest carbon emission generation, such as for a mode of transportation, route segment, or an entire route.

The score analyzer 256 may analyze (e.g., compiles, categorizes, etc.) the score data to identify a hierarchy of sustainability impact scores (e.g., indicating a lowest to highest estimated climate impact of the plurality of transportation modality options). In certain embodiments, the score analyzer 256 may analyze the score data associated with each combination of the plurality of routes and the plurality of transportation modality options, for example, to identify a sustainability impact score indicating a lowest estimated climate impact and/or lowest carbon emission generation, and/or to identify a hierarchy of sustainability impact scores, as described herein.

In various embodiments, the score analyzer 256 may be configured to analyze (e.g., compile, categorize, sort, etc.) the score data using a preference (e.g., a preferred route, a preferred transportation modality, etc.), as described herein. For example, the score analyzer 256 may identify a hierarchy of sustainability impact scores associated with the preferred route and/or the preferred transportation modality. The score analyzer 256 may analyze the score data to identify a score that indicates a lowest estimated travel time and/or a lowest safety impact rating (e.g., a lowest level of exposure to a potential safety hazard).

Additionally or alternatively, the score analyzer 256 may analyze the score data using a policy parameter. For example, the score analyzer 256 may identify a hierarchy of sustainability impact scores (e.g., associated with each combination of routes and/or transportation modalities) using the policy parameter (e.g., a hierarchy of lowest to highest policy cost (such as a UBI (usage-based insurance) policy cost), most available to least available policy coverage, highest amount of coverage to lowest amount of coverage associated with a route and/or transportation modality, etc.).

As shown, the score analyzer 256 may be configured to obtain input data (e.g., the score data, etc.), analyze the input data, and/or generate output data. For example, the score analyzer 256 may be configured to obtain (e.g., receive, request, pull, etc.) score data (e.g., via the score generator 254), analyze the score data, and generate recommendation data. As described herein, the recommendation data may identify a lowest score and/or a hierarchy of scores (e.g., a sustainability impact score, etc.), for example indicating an estimated climate impact relative to the plurality of estimated climate impacts, or an estimated carbon emission generated to a plurality of estimated carbon emission generated.

In some embodiments, the recommendation generator 258 may be configured to obtain input data, analyze the input data, and/or generate output data to be communicated to other components of the transportation system 102. For example, the recommendation generator 258 may be configured to obtain (e.g., receive, request, pull, etc.) recommendation data, analyze the recommendation data, and generate a transportation recommendation.

The recommendation generator 258 may be configured to obtain (e.g., receive, request, pull) recommendation data (e.g., via the score analyzer 256, etc.). The recommendation generator 258 may analyze (e.g., sort, compile, categorize, etc.) the recommendation data and generate a transportation recommendation. For example, the recommendation generator 258 may generate a transportation recommendation that includes a user interface (or voice bot or chat bot, such as a ChatGPT bot) that provides a recommended route, or otherwise presents a recommendation route and/or associated data, such as visually and/or audibly. As discussed above, in some embodiments the recommended route may indicate a lowest estimated climate impact (e.g., relative to the estimated climate impact of the plurality of routes), and/or lowest estimated carbon emission generated, such as for a mode of transportation, route segment, an entire route, and/or a combination of the foregoing.

In various embodiments, the recommendation generator 258 may generate a transportation recommendation that may include a user interface that provides a recommended transportation modality (or mode) option, or otherwise audibly or visually presents the recommended transportation modality (or mode) option, such as via a computing device, display screen, or voice bot. As discussed above, in some embodiments the recommended transportation modality option may indicate a lowest estimated climate impact (e.g., relative to the estimated climate impact of the plurality of transportation modality options). In some embodiments, the recommendation generator 258 may generate a transportation recommendation that includes a user interface (or bot, such as a voice bot or ChatGPT bot) that provides (or otherwise presents) a recommended route and a recommended transportation modality, or otherwise presents the recommended route via a user device or bot, such as audibly or visually/graphically.

In some embodiments, the recommendation generator 258 may generate a transportation recommendation that includes a plurality of recommended routes and/or a plurality of recommended transportation modalities. For example, the recommendation generator 258 may generate a transportation recommendation that includes a user interface that provides a plurality of combinations of routes and/or transportation modalities, for example for review (and/or selection) by a user or operator, or otherwise audibly or visually presents the transportation recommendation via a user computing device, such as a device display screen or a voice bot.

In various embodiments, the recommendation generator 258 may generate a transportation recommendation that includes one or more indicators. For example, the recommendation generator 258 may generate a transportation recommendation that includes an indicator indicating a level of climate impact (e.g., low, medium, high, etc. associated with each route/modality combination, etc.), an indicator indicating a travel time (e.g., slowest, medium, fastest, etc. associated with each route/modality combination, etc.), and/or an indicator indicating a safety rating (e.g., low, medium, high, etc. associated with each route/modality combination, etc.).

Additionally or alternatively, the recommendation generator 258 may generate a transportation recommendation that includes information relating to a policy parameter. For example, the recommendation generator 258 may generate a transportation recommendation that includes a policy parameter (e.g., discount, amount, coverage, coverage availability, coverage provider, UBI parameters or units, etc.) associated with each route/modality combination. In some embodiments, the recommendation generator 258 may generate a transportation recommendation that includes another suitable indicator (e.g., a mileage per gallon savings and/or cost-savings associated with each route/modality combination, an available discount or other cost-saving associated with each route/modality combination, an electronic communication (e.g., paperless) discount or benefit, etc.).

In certain embodiments, the recommendation generator 258 may be further configured to communicate the transportation recommendation to one or more devices, systems, and/or environments. For example, the recommendation generator 258 may be configured to communicate the transportation recommendation to the user device 110 (e.g., via the communications interface 202), for example for display (e.g., via the user interface 112) or voice reproduction, such as in the case of a voice bot, ChatGPT bot, etc.

Additionally or alternatively, the recommendation generator 258 may be configured to communicate the transportation recommendation to the database 260 and/or the storage system 160 (e.g., via the communications interface 202 via the network 170), for example for storage and/or subsequent transportation recommendation generation. In some embodiments, the recommendation generator 258 may be configured to communicate the transportation recommendation to the third-party system 130, the provider system 140, and/or the computing system 150 (e.g., via the communications interface 202 via the network 170), for example for storage and/or subsequent analysis (e.g., authorization, verification, etc.).

Exemplary Transportation System & Functionality

Figure 3:
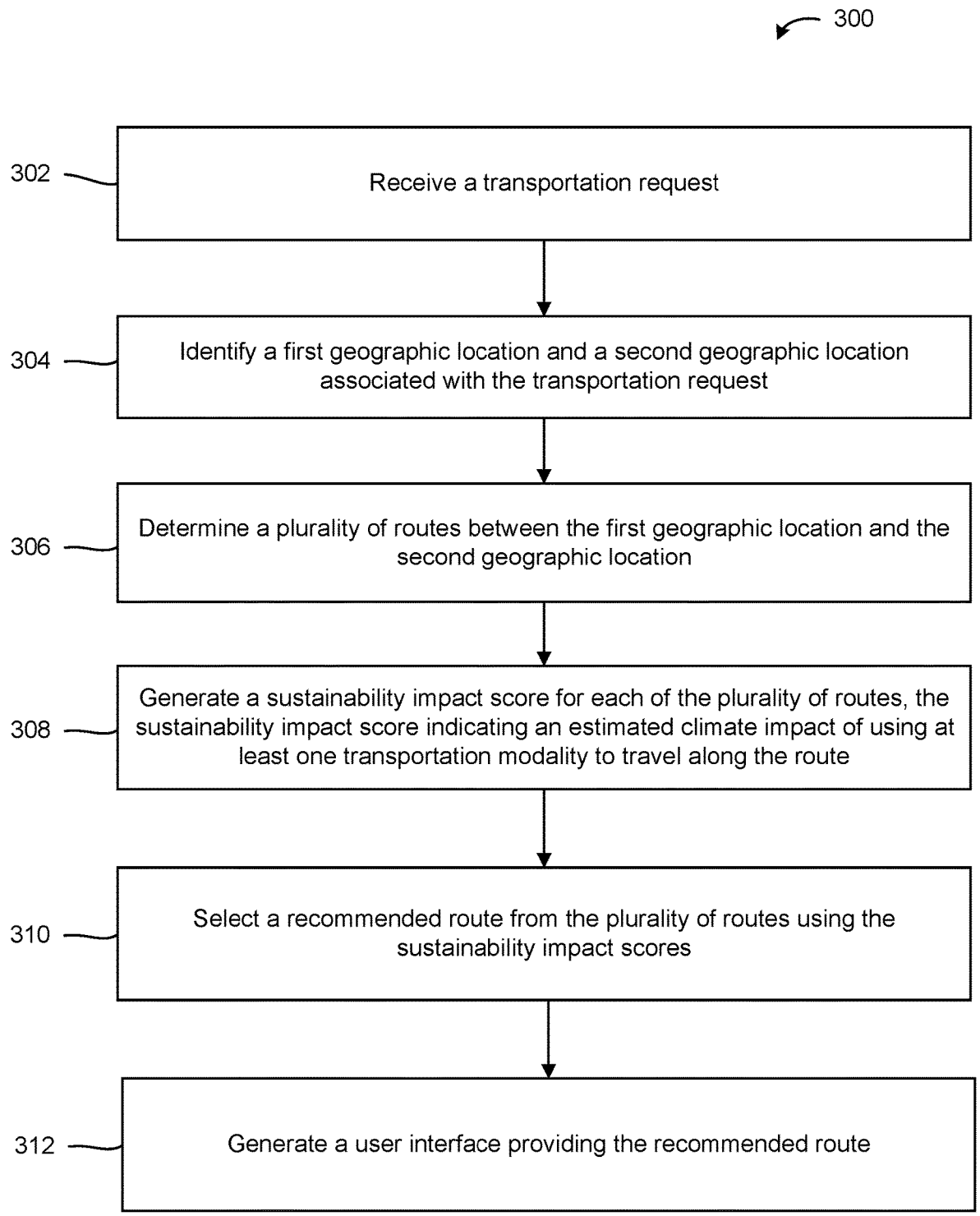
FIG. 3 is a flow diagram of an exemplary computer-implemented or computer-based process of generating a transportation recommendation based upon sustainability impacts of routes, according to some embodiments.

Referring now to FIG. 3, a computer-implemented or computer-based process, shown as process 300, for providing and/or generating a transportation recommendation is shown, according to some embodiments. Computer-implemented process 300 may be implemented by any and/or all the components of the travel services system 100 of FIGS. 1-2 (e.g., the transportation system 102, etc.). It should be appreciated that any and/or all the process 300 may be implemented by other systems, devices, and/or components (e.g., components of the travel services system 100, the transportation system 102, etc.). Further, it should be appreciated that in some embodiments, process 300 may implemented using additional, different, and/or fewer operations, actions, and/or functionality.

Computer-implemented process 300 may include receiving a transportation request (block 302), according to some embodiments. The transportation request may include a geographic location. For example, the transportation request may identify a geographic location a user or operator desires to travel (e.g., work, a grocery store, etc.). The transportation request may be received from an external or remote device (e.g., an edge device, the user device 110, the provider system 140, etc.).

In certain embodiments, the transportation request may include a plurality of geographic locations (e.g., a location a user or operator desires to travel from, a location to avoid, a location to stop, etc.). For example, the transportation request may identify a location a user desires to travel from (e.g., home), a location a user desires to travel to (e.g., work), and a location a user desires to avoid (e.g., a road that is under construction).

The transportation request may include additional information (e.g., a time associated with an initiation and/or communication of the transportation request, a device, user, and/or application identifier associated with initiation and/or communication of the transportation request, etc.). In some embodiments, the transportation request may include one or more preferences. For example, the transportation request may include a preferred route, a preferred mode of transportation, a transportation preference (e.g., a preference to reduce climate impact, limit travel time, reduce potential safety risks, etc.), etc. In some embodiments, the transportation request may include additional travel and/or transportation related information.

Computer-implemented process 300 may include identifying a first geographic location and a second geographic location associated with the transportation request (block 304), according to some embodiments. The transportation request may include a plurality of geographic locations, and a first geographic location and a second geographic location may be identified using the transportation request.

In some embodiments, geolocation and/or telematics data associated with the transportation request may be received. For example, geolocation and/or telematics data associated with an external or remote device that initiated the transportation request may be received (e.g., via an edge device, the user device 110, etc.). The first geographic location and/or the second geographic location may be identified using the geolocation and/or telematics data (and/or the transportation request). For example, a first geographic location (e.g., a user's home) may be identified using the geolocation and/or telematics data (e.g., associated with a device associated with the user), and the second geographic location may be identified using the transportation request (e.g., a request for the user to go to work). Telematics data may be vehicle telematics data, and may include acceleration, braking, cornering, speed, location, heading, GPS, and other data associated with a driver, driver profile, vehicle, vehicle profile, etc.

Computer-implemented process 300 may include determining a plurality of routes between the first geographic location and the second geographic location (block 306), according to some embodiments. For example, a first route may be determined between a user's home and work that involves traveling on backroads and side streets, a second route may be determined that involves traveling on a frontage road and then taking a highway, and a third route may be determined that involves traveling on a freeway in an express lane into the city.

In various embodiments, one or more of the plurality of routes are determined using information associated with one or more remote or external systems and/or devices. For example, one or more of the plurality of routes may be determined using mapping and/or navigation related information (e.g., maps, land plots, global positioning information, etc.) associated with a third-party system (e.g., a navigation application, etc.). Additionally or alternatively, one or more of the plurality of routes may be determined using mapping and/or navigation related information (e.g., maps, land plots, global positioning information, etc.) associated with a city or municipality and/or a public transportation entity.

One or more of the plurality of routes may be determined using transportation schedules and travel related information (e.g., timetables, routes, schedules, historic travel statistics, including delays, number of stops, number of turns, etc.) associated with a public and/or a private transportation entity. In some embodiments, one or more of the plurality of routes may be determined using travel information (e.g., a rating, historic trips/rentals, travel trends or tendencies, etc.) associated with a transportation network company. In some embodiments, one or more of the plurality of routes may be determined using information associated with a user or operator (e.g., a preferred route or travel modality, a characteristic of a vehicle owned or operated by the user or operator, travel trends/tendencies of the user or operator, including a tendency to speed, stop/start frequently, etc.). Additionally or alternatively, one or more of the plurality of routes may be determined using policy parameter information (e.g., an estimated coverage cost, an estimated coverage availability, etc. associated with a route) associated with a provider system or institution.

Computer-implemented process 300 may include generating a sustainability impact score for each of the plurality of routes (block 308), according to some embodiments. The stainability impact score may indicate an estimated climate impact of using at least one transportation modality to travel along each available route. In some embodiments, the sustainability impact scores may be generated based upon a preference (e.g., a preferred route, a preferred transportation modality, etc.). The sustainability impact scores may be generated using one or more weighting factors and/or ratings (e.g., one or more weighting factors between an estimated climate impact and a travel time, a travel safety rating, etc.). Additionally or alternatively, the sustainability impact scores may be generated using one or more policy parameters, for example a discount, UBI units or parameters, policy cost, a policy coverage, a policy availability, etc. associated with each of the plurality of routes. In some embodiments, the scores for each of the plurality of routes may indicate an estimated travel time associated with the plurality of routes, a safety rating (e.g., a level of exposure to a potential safety hazard) associated with the plurality of routes, and/or another suitable transportation related metric or characteristic.

Computer-implemented process 300 may include generating one or more policy parameters. As described herein, the policy parameters may be associated with one or more insurance products (e.g., coverages, policy terms/limits, discounts, UBI parameters, etc.). In some embodiments, the policy parameters may be generated using the sustainability impact scores. For example, process 300 may include generating a policy parameter (e.g., a discount or other insurance-cost saving, a premium, a policy coverage, a policy term, a policy limit, etc.) for each of the plurality of routes using the sustainability impact scores associated with the routes. In some embodiments, the policy parameters may be generated and/or modify one or more existing policy parameters, for example associated with an individual and/or product (e.g., to supplement coverage for a ride share service, to supplement coverage for a vehicle rental, etc.). Additionally or alternatively, the sustainability impact scores may be generated using one or more policy parameters (e.g., an existing or underlying policy coverage, UBI terms, discount terms, using a coverage availability and/or term associated with an individual and/or transportation modality, etc.).

Computer-implemented process 300 may include selecting a recommended route from the plurality of routes using the sustainability impact score (block 310), according to some embodiments. A recommended route may be selected based upon a sustainability impact score indicating a lowest estimated climate impact (e.g., relative to the estimated climate impact of the plurality of routes). In some embodiments, a recommended route may be selected using a policy parameter associated with the sustainability impact score. For example, a recommended route may be selected based upon a lowest cost associated with a policy premium of an associated route (such as the costs associated with one or more UBI (usage-based insurance) coverages or policies), a highest overall coverage of a policy associated with a route, a highest overall coverage of one or more modalities capable of traveling on an associated route, and/or another suitable policy parameter characteristic. In various embodiments, the recommended route may be one of a plurality of recommended routes (e.g., one of two, three, four, five, 10, etc. recommended routes).

Computer-implemented process 300 may include generating a user interface providing the recommended route (block 312), according to some embodiments. The ser interface (e.g., providing the recommended route, etc.) may be communicated to an external system and/or device (e.g., the user device 110, etc.), for example for display. The user interface may include one or more indicators, for example indicating a level of climate impact of the recommended route, a travel time associated with the recommended route, and/or a safety rating associated with the recommended route. The user interface may also include one or more indicators relating to a policy parameter associated with the recommended route, for example a cost, a coverage type, a coverage duration, a coverage availability, etc. associated with the recommended route.

In some embodiments, computer-implemented process 300 may include generating the user interface including a plurality of recommended routes. An external system and/or device (e.g., the user device 110) may present or display the user interface, for example providing the plurality of recommended routes for display and/or review. Process 300 may further include receiving a selection of a selected route, for example selected from one of the plurality of recommended routes. Process 300 may further include generating at least one policy parameter associated with the selected route (e.g., an insurance policy, a discount associated with the policy, UBI terms and conditions, coverage associated with a policy, a duration of coverage of a policy, etc. associated with the selected route) and providing the user interface including the at least one policy parameter associated with the selected route (e.g., to the user device 110 for display, etc.).

As an illustrative example, a user or operator may desire to travel from a first location (e.g., their home) to a second location (e.g., their work), with the aim of reducing their overall climate impact while traveling. In some embodiments, the user (e.g., via an application housed and/or executed on the user device 110) may initiate a transportation request, for example indicating that the user desires to drive to a select location (e.g., work). Based upon the transportation request and/or geolocation and/or telematics data (e.g., communicated along with the transportation request), a first location (e.g., a user's home) and a second location (e.g., the user's work) can be identified. Using the first location and the second location, a plurality of routes between the first location and the second location may be identified. The plurality of routes may be determined using mapping and/or navigation related information, as well as travel information associated with other third-party sources (e.g., reported accidents or construction events, etc.). For example, (i) a first route may be identified that involves traveling on side roads and city streets; (ii) a second route may be identified that involves traveling on a frontage road and a highway; and/or (iii) a third road may be identified that involves traveling on a freeway. Other combinations may be generated and utilized.

Further, a sustainability impact score for each of the plurality of routes may be generated, where the sustainability impact score indicates an estimated climate impact of traveling along each route. As discussed above, the sustainability impact score may represent an estimated climate impact of a mode/method/route of travel, considering factors such as vehicle characteristics (e.g., fuel efficiency, emissions levels, etc.), user or operator travel tendencies (e.g., tendency to speed, make frequent stops, accelerate/decelerate quickly, etc.), and/or route characteristics (e.g., frequency of traffic or construction, would involve several stops, etc.).

For example, when traveling into the city to work, a route that involves stopping/starting and slowly moving in heavy traffic may have a higher estimated climate impact (e.g., a higher sustainability impact score) compared to a route that involves consistent traveling speeds with minimal stopping/starting on an in-bound express lane. Similarly, driving a shorter route but one that involves stopping/starting and slowly moving in heavy traffic may have a higher estimated climate impact compared to a slightly longer route but one that involves consistent traveling speeds with minimal stopping/starting. Using the plurality of sustainability impact scores, a recommended route may be selected, and a user interface may be provided that includes the recommended route. In this way, a user may be provided with a recommended travel route that reduces the user's overall climate impact (e.g., compared to alternate routes) when traveling.

Transportation Recommendation Generation

Figure 4:
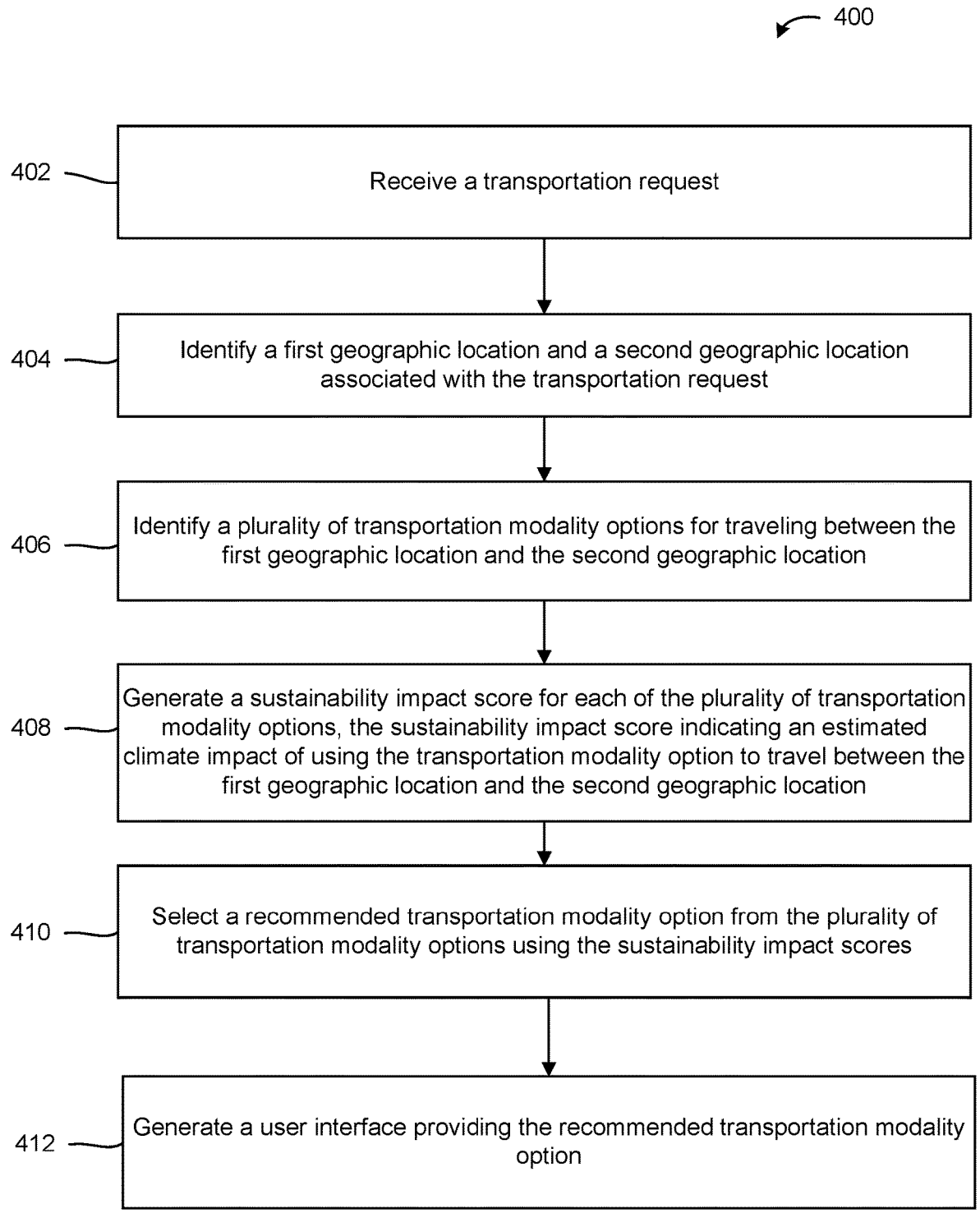
FIG. 4 is a flow diagram of an exemplary computer-implemented or computer-based process of generating a transportation recommendation based upon sustainability impacts of transportation modalities, according to some embodiments.

Referring now to FIG. 4, a computer-implemented or computer-based process, shown as process 400 for providing and/or generating a transportation recommendation is shown, according to some embodiments. Process 400 may be implemented by any and/or all the components of the travel services system 100 of FIGS. 1-2 (e.g., the transportation system 102, etc.). It should be appreciated that any and/or all the process 400 may be implemented by other systems, devices, and/or components (e.g., components of the travel services system 100, the transportation system 102, etc.). It should be appreciated that in some embodiments, process 400 may be implemented using additional, different, and/or fewer operations, actions, and/or functionality.

Computer-implemented process 400 may include receiving a transportation request (block 402), according to some embodiments. The transportation request may include a geographic location. For example, the transportation request may identify a geographic location a user or operator desires to travel (e.g., work, a grocery store, etc.). The transportation request may be received from an external or remote device (e.g., an edge device, the user device 110, the provider system 140, etc.).

In some embodiments, the transportation request may include a plurality of geographic locations (e.g., a location a user or operator desires to travel from, a location to avoid, a location to stop, etc.). For example, the transportation request may identify a location a user desires to travel from (e.g., home), a location a user desires to travel to (e.g., work), and a location a user desires to avoid (e.g., a road where an accident has been identified). In some embodiments, the transportation request may include additional information (e.g., a time associated with an initiation and/or communication of the transportation request, a device, user, and/or application identifier associated with initiation and/or communication of the transportation request, etc.).

In various embodiments, the transportation request may include a preference. For example, the transportation request may include a preferred mode of transportation, a preferred route, a transportation preference (e.g., a preference to reduce climate impact, limit travel time, reduce potential safety risks, etc.). In some embodiments, the transportation request may include additional travel and/or transportation related information.

Computer-implemented process 400 may include identifying a first geographic location and a second geographic location associated with the transportation request (block 404), according to some embodiments. In some embodiments, the transportation request may include a plurality of geographic locations, and a first geographic location and a second geographic location is/are identified using the transportation request. Additionally or alternatively, geolocation and/or telematics data associated with the transportation request may be received. For example, geolocation and/or telematics data associated with an external or remote device that initiated the transportation request may be received (e.g., via an edge device, the user device 110, etc.).

The first geographic location and/or the second geographic location may be identified using the geolocation and/or telematics data (and/or the transportation request). For example, a first geographic location (e.g., a user's home) may be identified using the geolocation and/or telematics data (e.g., associated with a device associated with the user), and the second geographic location may be identified using the transportation request (e.g., a request for the user to go to work).

Computer-implemented process 400 may include identifying a plurality of transportation modality or mode options for traveling between the first geographic location and the second geographic location (block 406), according to some embodiments. For example, a first transportation modality option may be identified that involves taking a ride share service to a public transportation station and taking a train into the city to work, a second transportation modality option may be identified that involves taking a bus to the public transportation station and taking a shuttle into the city, and a third transportation modality option may be identified that involves driving to the public transportation station and taking a bus into the city.

In some embodiments, one or more of the plurality of transportation modality options may be determined using information associated with one or more remote or external systems and/or devices. For example, one or more of the plurality of transportation modality options may be determined using transportation schedules and/or travel related information (e.g., timetables, routes, schedules, historic travel statistics, including delays, number of stops, number of turns, etc.) associated with a public transportation entity (e.g., public bus or train, etc.) and/or a private transportation entity (e.g., taxi or shuttle service, etc.).

One or more of the plurality of transportation modality options may be determined using mapping and/or navigation related information (e.g., maps, land plots, global positioning information, etc.) associated with a third-party system (e.g., a navigation application, etc.). In some embodiments, one or more of the plurality of transportation modality options may be determined using mapping and/or navigation related information (e.g., maps, land plots, global positioning information, etc.) associated with a city or municipality and/or a public transportation entity. Additionally or alternatively, one or more of the plurality of transportation modality options may be determined using travel information (e.g., a rating, historic trips/rentals, travel trends or tendencies, etc.) associated with a transportation network company.

Further, one or more of the plurality of transportation modality options may be determined using information associated with a user or operator (e.g., a preferred route or travel modality, travel trends/tendencies of the user or operator, etc.). In some embodiments, one or more of the plurality of transportation modality options may be determined using policy parameter information (e.g., an estimated coverage cost, an estimated coverage availability, etc. associated with a transportation modality) associated with a provider system or institution.

Computer-implemented process 400 may include generating a sustainability impact score for each of the plurality of transportation modality options (block 408), according to some embodiments. The sustainability impact score may indicate an estimated climate impact of using each of the transportation modality options (e.g., including the at least one transportation modality) for traveling between the first geographic location and the second geographic location.

The sustainability impact scores may be generated based upon a preference (e.g., a preferred route, a preferred transportation modality, etc.). In some embodiments, the sustainability impact scores may be generated using one or more weighting factors and/or ratings (e.g., one or more weighting factors between an estimated climate impact and a travel time, a travel safety rating, etc.). In various embodiments, the sustainability impact scores may be generated using one or more policy parameters, for example a policy discount, UBI parameters or units, a policy coverage, a policy availability, etc. associated with each of the plurality of transportation modality options. The scores for each of the plurality of transportation modality options may indicate an estimated travel time, a safety rating (e.g., a level of exposure to a potential safety hazard), and/or another suitable transportation related metric or characteristic.

In some embodiments, computer-implemented process 400 may include generating one or more policy parameters. As described herein, the policy parameters may be associated with one or more insurance products (e.g., coverages, policy terms/limits, discounts, UBI costs, etc.). In some embodiments, the policy parameters may be generated using the sustainability impact scores. For example, process 400 may include generating a policy parameter (e.g., a discount, a premium, a policy coverage, a policy term, a policy limit, etc.) for each of the plurality of transportation modality options using the sustainability impact scores associated with each option.

The policy parameters may be generated and/or modify one or more existing policy parameters, for example associated with an individual and/or product (e.g., to supplement coverage for a ride share service, to supplement coverage for a vehicle rental, etc.). In some embodiments, the sustainability impact scores may be generated using one or more policy parameters (e.g., an existing or underlying policy coverage, using a coverage availability and/or term associated with an individual and/or transportation modality, etc.).

Computer-implemented process 400 may include selecting a recommended transportation modality option from the plurality of transportation modality options using the sustainability impact score (block 410), according to some embodiments. A recommended transportation modality option may be selected based upon a sustainability impact score indicating a lowest estimated climate impact (e.g., relative to the estimated climate impact of the plurality of transportation modality options).

In some embodiments, a recommended transportation modality option may be selected using a policy parameter associated with the sustainability impact score. For example, a recommended transportation modality may be selected based upon a lowest cost associated with a policy of the modality, a highest overall coverage of a policy associated with the modality, a duration of coverage of the transportation modality option, and/or another suitable policy parameter characteristic. In some embodiments, the recommended transportation modality option may be one of a plurality of recommended transportation modality options (e.g., one of two, three, four, five, 10, etc. recommended routes).

Computer-implemented process 400 may include generating a user interface providing the recommended transportation modality option (block 412), according to some embodiments. The user interface (e.g., providing the recommended transportation modality option, etc.) may be communicated to an external system and/or device (e.g., the user device 110, etc.), for example for display. The user interface may include one or more indicators, for example indicating a level of climate impact of the recommended transportation modality option, a travel time associated with the recommended transportation modality option, and/or a safety rating associated with the recommended transportation modality option. The user interface may also include one or more indicators relating to a policy parameter associated with the recommended transportation modality option, for example a discount, cost, a coverage type, a coverage duration, a coverage availability, etc. associated with the recommended transportation modality option.

In some embodiments, computer-implemented process 400 may include generating the user interface including a plurality of recommended transportation modality options. An external system and/or device (e.g., the user device 110) may present or display the user interface, for example providing the plurality of recommended transportation modality options for display and/or review. Process 400 may further include receiving a selection of a selected transportation modality option, for example selected from one of the plurality of recommended transportation modality options. Process 400 may further include generating at least one policy parameter associated with the selected transportation modality option (e.g., an insurance policy, a discount, a cost of a policy, coverage associated with a policy, a duration of coverage of a policy, etc. associated with the selected transportation modality option) and providing the user interface including the at least one policy parameter associated with the selected transportation modality option (e.g., to the user device 110 for display, etc.).

As an illustrative example, a user or operator may desire to travel from a first location (e.g., their home) to a second location (e.g., their work), with the aim of reducing their overall climate impact while traveling. In some embodiments, the user (e.g., via an application housed and/or executed on the user device 110) may initiate a transportation request, for example indicating that the user desires to travel to a select location (e.g., work). Based upon the transportation request and/or geolocation and/or telematics data (e.g., communicated along with the transportation request), a first location (e.g., a user's home) and a second location (e.g., the user's work) may be identified. Using the first location and the second location, a plurality of available transportation modality options for traveling between the first location and the second location may be identified.

The plurality of transportation modality options may be determined using mapping and/or navigation related information, as well as travel information associated with other third-party sources (e.g., reported accidents or construction events, etc.). Further, a sustainability impact score for each of the plurality of transportation options may be generated, where the sustainability impact score indicates an estimated climate impact of using the transportation options to travel along a select route. As discussed above, the sustainability impact score may represent an estimated climate impact of a mode/method/route of travel, considering factors such as vehicle characteristics (e.g., fuel efficiency, emissions levels, etc.), user or operator travel tendencies (e.g., tendency to speed, make frequent stops, accelerate/decelerate quickly, etc.), and/or route characteristics (e.g., frequency of traffic or construction, would involve several stops, etc.). For example, when traveling into the city to work, a transportation modality (e.g., a car) that involves stopping/starting and slowly moving in heavy traffic may have a higher estimated climate impact (e.g., a higher sustainability impact score) compared to a transportation modality that includes designated transportation lanes and/or express lanes (e.g., a train or bus) traveling into the city.

Similarly, driving or taking a ride share service to a public transportation station (e.g., prior to utilizing a train or bus) may have a higher estimated climate impact compared to using an alternative form of transportation, for example a bicycle or walking. Using the plurality of sustainability impact scores, a recommended transportation modality option may be selected, and a user interface may be provided that includes the recommended transportation modality option. In this way, a user may be provided with a recommended travel modality and/or modalities that reduces the user's overall climate impact (e.g., compared to alternate modalities) when traveling.

Additional Exemplary Recommendation Generation

Figure 5:
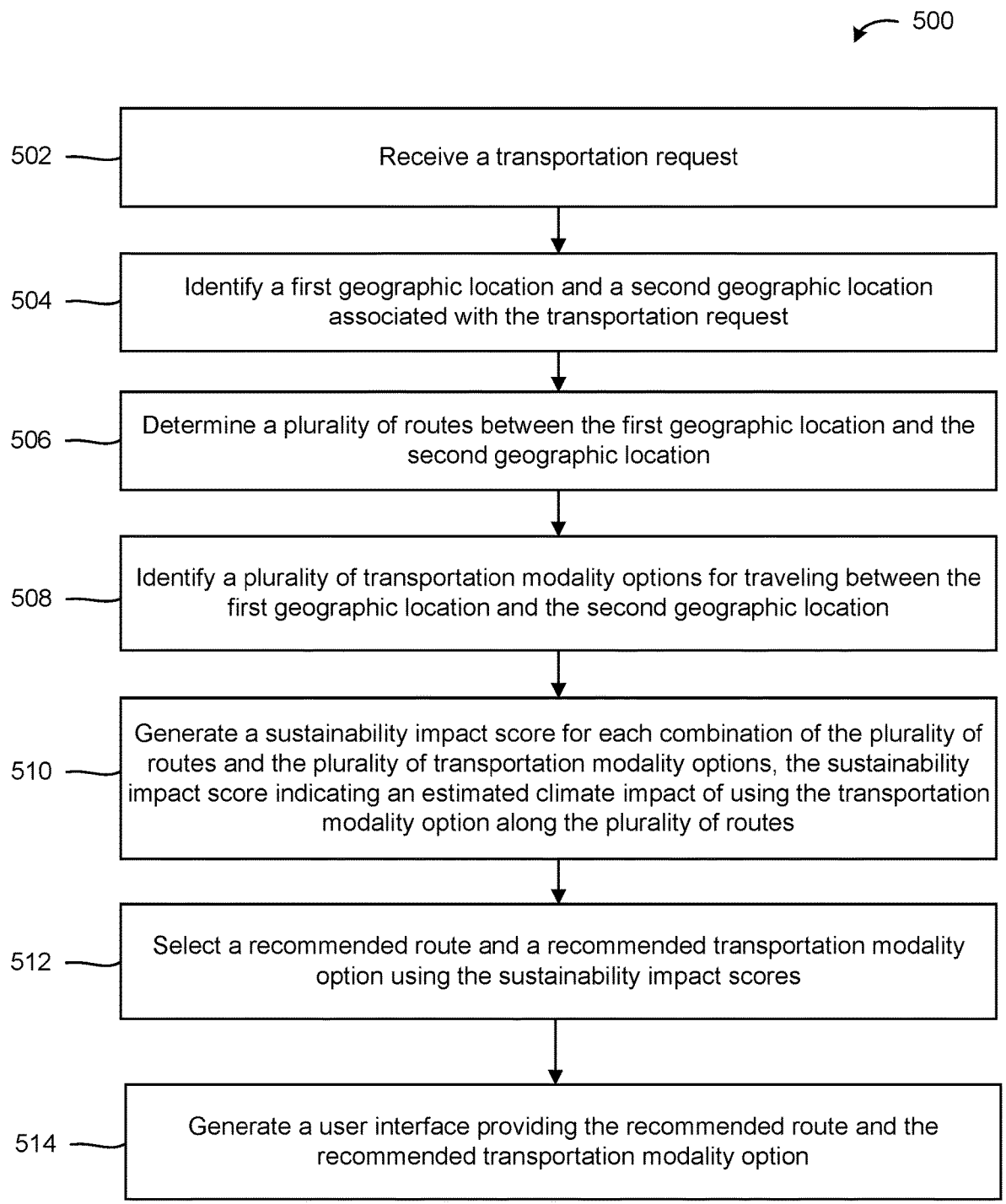
FIG. 5 is a flow diagram of an exemplary computer-implemented or computer-based process of generating a transportation recommendation based upon sustainability impacts of routes and transportation modalities, according to some embodiments.

Referring now to FIG. 5, a computer-implemented or computer-based process, shown as process 500, for providing and/or generating a transportation recommendation is shown, according to some embodiments. Computer-implemented process 500 may be implemented by any and/or all the components of the travel services system 100 of FIGS. 1-2 (e.g., the transportation system 102, etc.). It should be appreciated that any and/or all the process 500 may be implemented by other systems, devices, and/or components (e.g., components of the travel services system 100, the transportation system 102, etc.). It should be appreciated that in some embodiments, process 500 may be implemented using additional, different, and/or fewer operations, actions, and/or functionality.

Computer-implemented process 500 may include receiving a transportation request (block 502), according to some embodiments. The transportation request may include a geographic location. For example, the transportation request may identify a geographic location a user or operator desires to travel (e.g., work, a grocery store, etc.). The transportation request may be received from an external or remote device (e.g., an edge device, the user device 110, the provider system 140, etc.). In some embodiments, the transportation request may include a plurality geographic locations, additional information (e.g., a time associated with the transportation request, etc.), and/or a preference (e.g., a preferred mode of transportation, a preferred route, a transportation preference, etc.), as discussed herein. In certain embodiments, the transportation request may include additional travel and/or transportation related information.

Computer-implemented process 500 may include identifying a first geographic location and a second geographic location associated with the transportation request (block 504), according to some embodiments. The transportation request may include a plurality of geographic locations, and a first geographic location and a second geographic location may be identified using the transportation request. In some embodiments, geolocation and/or telematics data associated with the transportation request is received. The first geographic location and/or the second geographic location may be identified using the geolocation and/or telematics data (and/or the transportation request), as described herein.

Computer-implemented process 500 may include determining a plurality of routes between the first geographic location and the second geographic location (block 506), according to some embodiments. For example, (i) a first route may be determined between a user's home and work that involves traveling on backroads and side streets; (ii) a second route may be determined that involves traveling on a frontage road and then taking a highway; and/or (iii) a third route may be determined that involves traveling in an express lane into the city. In some embodiments, one or more of the plurality of routes may be determined using information associated with one or more remote or external systems and/or devices (e.g., mapping and/or navigation related information, transportation schedules travel information associated with a transportation network company, information associated with a user or operator, etc.), as discussed herein. In some embodiments, one or more of the plurality of routes may be determined using policy parameter information (e.g., an estimated coverage cost, an estimated coverage availability, etc. associated with a route) associated with a provider system or institution.

Computer-implemented process 500 may include identifying a plurality of transportation modality options for traveling between the first geographic location and the second geographic location (block 508), according to some embodiments. For example, (i) a first transportation modality option may be identified that involves taking a ride share service to a public transportation station and taking a bus into the city to work; (ii) a second transportation modality option may be identified that involves taking a shuttle to the public transportation station and taking a bus into the city; and/or (iii) a third transportation modality option may be identified that involves driving to the public transportation station and taking a train into the city.

In some embodiments, one or more of the plurality of transportation modality options may be determined using information associated with one or more remote or external systems and/or devices (e.g., mapping and/or navigation related information, transportation schedules travel information associated with a transportation network company, information associated with a user or operator, etc.), as discussed herein. One or more of the plurality of routes may be determined using policy parameter information (e.g., an estimated coverage cost, an estimated coverage availability, a discount, a UBI parameter or unit, etc. associated with a route) associated with a provider system or institution. In certain embodiments, one or more of the plurality of transportation modality options may be determined using policy parameter information (e.g., an estimated coverage cost, an estimated coverage availability, etc. associated with a transportation modality) associated with a provider system or institution.

Computer-implemented process 500 may include generating a sustainability impact score for each combination of the plurality of route and the plurality of transportation modality options (block 510), according to some embodiments. The sustainability impact score may indicate an estimated climate impact of using each of the transportation modality options along each of the plurality of routes. As discussed herein, in some embodiments the sustainability impact scores may be generated based upon a preference (e.g., a preferred route, a preferred transportation modality, etc.), and/or using one or more weighting factors and/or ratings (e.g., one or more weighting factors between an estimated climate impact and a travel time, a travel safety rating, etc.). In some embodiments, the sustainability impact scores may be generated using one or more policy parameters (e.g., a policy cost, discount, a policy coverage, a policy availability, etc.), for example associated with each of the plurality of transportation modality options along each of the plurality of routes. The scores for each of the plurality of transportation routes/modality options may indicate an estimated travel time, a safety rating (e.g., a level of exposure to a potential safety hazard), and/or another suitable transportation related metric or characteristic.

Computer-implemented process 500 may include generating one or more policy parameters. As described herein, the policy parameters may be associated with one or more insurance products (e.g., coverages, policy terms/limits, discounts, premiums, etc.). In some embodiments, the policy parameters may be generated using the sustainability impact scores. For example, process 500 may include generating a policy parameter (e.g., a discount, a premium, a policy coverage, a policy term, a policy limit, etc.) for each combination of the plurality of routes and the plurality of transportation modality options using the sustainability impact scores associated with each combination. The policy parameters may be generated and/or modified using one or more existing policy parameters, for example associated with an individual and/or product (e.g., to supplement coverage for a ride share service along a route, to supplement coverage for a vehicle rental in a certain location, etc.). In certain embodiments, the sustainability impact scores are generated using one or more policy parameters (e.g., an existing or underlying policy coverage, using a coverage availability and/or term associated with an individual and/or transportation modality, etc.).

Computer-implemented process 500 may include selecting a recommended route and a recommended transportation modality using the sustainability impact score (block 512), according to some embodiments. The recommended route and the recommended transportation modality option may be selected based upon a sustainability impact score indicating a lowest estimated climate impact (e.g., relative to the estimated climate impact of the plurality of transportation routes and transportation modality options). In some embodiments, a recommended route and a recommended transportation modality option may be selected using a policy parameter associated with the sustainability impact score (e.g., a lowest cost associated with a policy of the modality along a route, a highest overall coverage of a policy associated with the modality along the route, a duration of coverage of the transportation modality option along the route, and/or another suitable policy parameter characteristic). The recommended transportation modality option may be one of a plurality of recommended transportation modality options (e.g., one of two, three, four, five, 10, etc. recommended routes).

Computer-implemented process 500 may include generating a user interface providing the recommended transportation modality option (block 514), according to some embodiments. The user interface (e.g., providing the recommended transportation modality option, etc.) may be communicated to an external system and/or device (e.g., the user device 110, etc.), for example for display. The user interface may include one or more indicators, for example indicating a level of climate impact of the recommended route and the recommended transportation modality option, a travel time associated with the recommended route and the recommended transportation modality option, and/or a safety rating associated with the recommended route and the recommended transportation modality option. The user interface may also include one or more indicators relating to a policy parameter associated with the recommended route and the recommended transportation modality option, for example a discount, a cost, a coverage type, a coverage duration, a coverage availability, etc. associated with the transportation recommendation. The user interface may display information or audibly present information, such as via a ChatGPT bot.

Computer-implemented process 500 may include generating the user interface including a plurality of recommended routes and transportation modality options. An external system and/or device (e.g., the user device 110) may present or display the user interface, for example providing the plurality of recommended routes and transportation modality options for display and/or review. Process 500 may further include receiving a selection of a selected transportation route and modality option, for example selected from one of the plurality of recommended routes and transportation modality options.

Computer-implemented process 500 may further include generating at least one policy parameter associated with the selected route and transportation modality option (e.g., an insurance policy, a cost of a policy, coverage associated with a policy, a duration of coverage of a policy, etc. associated with the selected route and transportation modality option) and providing the user interface including the at least one policy parameter associated with the selected route and transportation modality option (e.g., to the user device 110 for display, etc.).

As an illustrative example, a user or operator may desire to travel from a first location (e.g., their home) to a second location (e.g., their work), with the aim of reducing their overall climate impact while traveling. In some embodiments, the user (e.g., via an application housed and/or executed on the user device 110) may initiate a transportation request, for example indicating that the user desires to travel to a select location (e.g., work). Based upon the transportation request and/or geolocation and/or telematics data (e.g., communicated along with the transportation request), a first location (e.g., a user's home) and a second location (e.g., the user's work) may be identified.

Using the first location and the second location, a plurality of routes between the first location and the second location can be identified. For example, (1) a first route may be determined between a user's home and work that involves traveling on backroads and side streets; (2) a second route may be determined that involves traveling on a frontage road and then taking a highway; and/or (3) a third route may be determined that involves traveling in an express lane into the city.

In addition, using the first location and the second location, a plurality of available transportation modality options for traveling between the first location and the second location may be identified. For example, a first transportation modality option may be identified that involves taking (i) a ride share service to a public transportation station and taking a bus into the city to work; (ii) a second transportation modality option may be identified that involves taking a shuttle to the public transportation station and taking a bus into the city; and/or (iii) a third transportation modality option may be identified that involves driving to the public transportation station and taking a train into the city.

Further, a sustainability impact score for each combination of the plurality of routes and the plurality of transportation options may be generated. For example, (1) a first sustainability impact score may be generated for using the first transportation modality option (e.g., a ride share service and a bus) along the first route (e.g., backroads and side streets); (2) a second sustainability impact score may be generated for using the first transportation modality option (e.g., a ride share service and a bus) along the second route (e.g., frontage roads and highway); (3) a third sustainability impact score may be generated for using the first transportation modality option (e.g., a ride share service and a bus) along the third route (e.g., an express lane into the city); (4) a fourth sustainability impact score may be generated for using the second transportation modality option (e.g., a shuttle and a bus) along the first route (e.g., backroads and side streets), etc.

As discussed above, the sustainability impact score may represent an estimated climate impact of a mode/method/route of travel, considering factors such as vehicle characteristics (e.g., fuel efficiency, emissions levels, etc.), user or operator travel tendencies (e.g., tendency to speed, make frequent stops, accelerate/decelerate quickly, etc.), and/or route characteristics (e.g., frequency of traffic or construction, would involve several stops, etc.).

Using the plurality of sustainability impact scores, a recommended route and a recommended transportation modality option may be selected, and a user interface may be provided that includes the recommended route and the recommended transportation modality option. In this way, a user may be provided with a recommended route and a recommended travel modality (and/or modalities) that reduces the user's overall climate impact (e.g., compared to alternative routes and/or modalities) when traveling.

Exemplary Machine Learning and Generative AI

As discussed elsewhere, some embodiments may utilize machine learning, generative artificial intelligence, or other advanced computing techniques. As such, in some embodiments, generative artificial intelligence (AI) models (also referred to as generative machine learning (ML) models) and/or other AI/ML models discussed herein may be implemented via and/or coupled to one or more voice bots and/or chatbots that may be configured to utilize artificial intelligence and/or machine learning techniques. For instance, the voice and/or chatbot may be a ChatGPT chatbot and/or a ChatGPT-based bot. The voice and/or chatbot may employ supervised, unsupervised, and/or semi-supervised machine learning techniques, which may be followed by, and/or used in conjunction with, reinforced and/or reinforcement learning techniques. The voice bot, chatbot, ChatGPT bot, ChatGPT-based bot, and/or other such generative model may generate audible or verbal output, text or textual output, visual or graphical output, output for use with speakers and/or display screens of a mobile computing device, and/or other types of output for user and/or other computer or bot consumption.

Noted above, in some embodiments, a chatbot or other computing device may be configured to implement machine learning, such that the computing device "learns" to analyze, organize, and/or process data without being explicitly programmed. Machine learning and/or artificial intelligence may be implemented through machine learning methods and algorithms. In one exemplary embodiment, a machine learning module may be configured to implement the ML methods and algorithms.

As used herein, a voice bot, chatbot, ChatGPT bot, ChatGPT-based bot, and/or other such generative model (referred to broadly as "chatbot" herein) may refer to a specialized system for implementing, training, utilizing, and/or otherwise providing an AI or ML model to a user for dialogue interaction (e.g., "chatting"). Depending on the embodiment, the chatbot may utilize and/or be trained according to language models, such as natural language processing (NLP) models and/or large language models (LLMs). Similarly, the chatbot may utilize and/or be trained according to generative adversarial network (GAN) techniques, such as the machine learning techniques, algorithms, and systems described in more detail below.

The chatbot may receive inputs from a user via text input, spoken input, gesture input, etc. The chatbot may then use AI and/or ML techniques as described herein to process and analyze the input before determining an output and displaying the output to the user. Depending on the embodiment, the output may be in a same or different form than the input (e.g., spoken, text, gestures, etc.), may include images, and/or may otherwise communicate the output to the user in an overarching dialogue format.

In various embodiments, at least one of a plurality of ML methods and algorithms may be applied to implement and/or train the chatbot, which may include but are not limited to: linear or logistic regression, instance-based algorithms, regularization algorithms, decision trees, Bayesian networks, cluster analysis, association rule learning, artificial neural networks, deep learning, combined learning, reinforced learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, a chatbot ML module employs supervised learning, which involves identifying patterns in existing data to make predictions about subsequently received data. Specifically, the chatbot ML module may be "trained" using training data, which includes example inputs and associated example outputs. Based upon the training data, the chatbot ML module may generate a predictive function which maps outputs to inputs and may utilize the predictive function to generate ML outputs based upon data inputs. The exemplary inputs and exemplary outputs of the training data may include any of the data inputs or ML outputs described above. In the exemplary embodiment, a processing element may be trained by providing it with a large sample of data with known characteristics or features.

In another embodiment, the chatbot ML module may employ unsupervised learning, which involves finding meaningful relationships in unorganized data. Unlike supervised learning, unsupervised learning does not involve user-initiated training based upon example inputs with associated outputs. Rather, in unsupervised learning, the chatbot ML module may organize unlabeled data according to a relationship determined by at least one ML method/algorithm employed by the chatbot ML module. Unorganized data may include any combination of data inputs and/or ML outputs as described above.

In yet another embodiment, the chatbot ML module may employ semi-supervised learning, which involves using thousands of individual supervised machine learning iterations to generate a structure across the multiple inputs and outputs. In this way, the chatbot ML module may be able to find meaningful relationships in the data, similar to unsupervised learning, while leveraging known characteristics or features in the data to make predictions via a ML output.

In yet another embodiment, the chatbot ML module may employ reinforcement learning, which involves optimizing outputs based upon feedback from a reward signal. Specifically, the chatbot ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. Other types of machine learning may also be employed, including deep or combined learning techniques.

In certain embodiments, the chatbot ML module may be used in conjunction with the machine vision, image recognition, object identification, AR glasses, VR headsets, other input/output devices, and/or other image processing techniques discussed below. Additionally or alternatively, in some embodiments, the chatbot ML module may be configured and/or trained to implement one or more aspects of the machine vision, image recognition, objection identification, and/or other image processing techniques discussed below.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied, or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only and are thus not intended to limit in any way the definition and/or meaning of the term "processor."

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

In some embodiments, a computer program is provided, and the program is embodied on a computer readable medium. In some embodiments, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method operations, actions, or functionality may be varied or re-sequenced according to alternative embodiments. Other substitutions, modifications, changes, and omissions can be made in the design, operating conditions, and arrangement of the example embodiments without departing from the scope of the present disclosure.

As used herein, an element or operation recited in the singular and proceeded with the word "a" or "an" should be understood as not excluding plural elements or operations, unless such exclusion is explicitly recited. Furthermore, references to "exemplary embodiment," "one embodiment," or "some embodiment" of the present disclosure are not intended to be interpreted as excluding the existence of additional embodiments that also incorporate the recited features.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The patent claims at the end of this document are not intended to be construed under 35 U.S.C. § 112 (f) unless traditional means-plus-function language is expressly recited, such as "means for" or "step for" language being expressly recited in the claim(s).

Although the Figures show a specific order of method operations, actions, or functionality, the order of such may differ from what is depicted. Also, two or more operations, actions, or functionalities may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection operations or actions, processing operations or actions, comparison operations or actions, and decision operations or actions.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The term "coupled" and variations thereof, as used herein, means the joining of two members directly or indirectly to one another. Such joining may be stationary (e.g., permanent, or fixed) or moveable (e.g., removable, or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

In various implementations, the functionality and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular industrial environment or portion of an industrial environment. Additionally or alternatively, the operations may be performed by a combination of one or more central or offsite computing devices/servers and one or more local controllers/computing devices. All such implementations are contemplated within the scope of the present disclosure.

Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

What is claimed is:

1. A transportation system for generating a transportation recommendation, the system comprising:
one or more memory devices having instructions stored thereon that, when executed by one or more processors, cause the one or more processors to perform operations comprising:
receiving a transportation request;
identifying, using the transportation request, a first geographic location and a second geographic location associated with the transportation request;
determining, using the first geographic location and the second geographic location, a plurality of routes between the first geographic location and the second geographic location;
generating, using a trained machine learning model, a sustainability impact score for each of the plurality of routes, the trained machine learning model trained using historical transportation data to establish at least one correlation between a sustainability metric and routes, and the sustainability impact score indicating an estimated climate impact of using at least one transportation modality to travel along a route of the plurality of routes;
selecting a recommended route from the plurality of routes using the sustainability impact scores of the plurality of routes; and
generating a user interface providing the recommended route.

2. The transportation system of claim 1, wherein the operations comprise selecting the recommended route responsive to determining the recommended route has a sustainability impact score indicating a lowest estimated climate impact of the estimated climate impacts of the plurality of routes.

3. The transportation system of claim 1, wherein the operations further comprise:
receiving data including an electric power characteristic of the at least one transportation modality; and
generating the sustainability impact score for each of the plurality of routes using the electric power characteristic of the at least one transportation modality.

4. The transportation system of claim 1, wherein the operations further comprise:
receiving user data including historic transportation characteristics of a user, the historic transportation characteristics including at least one of an average transportation speed, an average number of turns during a travel event, or an average travel time; and
generating the sustainability impact score for each of the plurality of routes using the historic transportation characteristics of the user.

5. The transportation system of claim 1, wherein the operations further comprise:
receiving geographic data associated with the plurality of routes, the geographic data including at least one of a road density score indicating a number of crossroads along a route, a construction rating indicating one or more construction events along a route, or an efficient travel option indicating availability of a lane available to vehicles traveling with multiple occupants along a route; and
generating the sustainability impact score for each of the plurality of routes using the geographic data.

6. The transportation system of claim 1, wherein the operations further comprise:
receiving historic transportation data associated with each of the plurality of routes, the historic transportation data including at least one of an average transportation speed, an average number of turns during a travel event, an average number of stops during a travel event, or an average travel time during a travel event; and
generating the sustainability impact score for each of the plurality of routes using the historic transportation data.

7. The transportation system of claim 1, wherein the operations further comprise:
receiving a time associated with the transportation request; and
generating the sustainability impact score for each of the plurality of routes using the time associated with the transportation request.

8. The transportation system of claim 1, wherein the sustainability impact score is associated with a fuel efficiency of the at least one transportation modality along the route.

9. The transportation system of claim 1, wherein the operations further comprise generating at least one insurance policy parameter associated with the recommended route and the at least one transportation modality and providing the at least one insurance policy parameter via the user interface.

10. The transportation system of claim 1, wherein the operations further comprise:
receiving audiovisual data associated with at least one travel event of a user; and
generating the sustainability impact score for each of the plurality of routes using the audiovisual data.

11. The transportation system of claim 1, wherein the recommended route is one of a plurality of recommended routes, and wherein the operations further comprise:
generating the user interface providing the plurality of recommended routes;
receiving a selection of a selected route; and
providing the user interface including at least one insurance policy parameter associated with the selected route.

12. The transportation system of claim 1, wherein the operations further comprise:
identifying a plurality of transportation modality options for traveling between the first geographic location and the second geographic location, each of the plurality of transportation modality options comprising at least one transportation modality option;
generating a sustainability impact score for each of the plurality of transportation modality options, the sustainability impact score indicating an estimated climate impact of using the at least one transportation modality option to travel between the first geographic location and the second geographic location;
selecting a recommended transportation modality option from the plurality of transportation modality options using the sustainability impact scores of the plurality of transportation modality options; and
generating the user interface providing the recommended transportation modality option.

13. A computer-implemented method for generating a transportation recommendation, the computer-implemented method comprising:

receiving, using one or more processors and one or more computer-readable storage media having instructions stored thereon executable by the processors, a transportation request;

identifying, using the one or more processors and using the transportation request, a first geographic location and a second geographic location associated with the transportation request;

identifying, using the one or more processors, a plurality of transportation modality options for traveling between the first geographic location and the second geographic location, each of the plurality of transportation modality options comprising at least one transportation modality;

generating, using a trained machine learning model and the one or more processors, a sustainability impact score for each of the plurality of transportation modality options, the trained machine learning model trained using historical transportation data to establish at least one correlation between a sustainability metric and transportation modality options, and the sustainability impact score indicating an estimated climate impact of using the at least one transportation modality to travel between the first geographic location and the second geographic location;

selecting, using the one or more processors, a recommended transportation modality option from the plurality of transportation modality options using the sustainability impact scores of the plurality of transportation modality options; and generating, using the one or more processors, a user interface providing the recommended transportation modality option.

14. The computer-implemented method of claim 13, further comprising:

receiving, using the one or more processors, a user preference of a transportation modality option selected from the plurality of transportation modality options; and selecting, using the one or more processors, the recommended transportation modality option using the user preference.

15. The computer-implemented method of claim 13, wherein the at least one transportation modality includes at least one of a bicycle, a scooter, a bus, vehicle, a shared vehicle, a train, or an airplane.

16. The computer-implemented method of claim 13, further comprising:

receiving, using the one or more processors, audiovisual data associated with at least one travel event of a user; and selecting, using the one or more processors, the recommended transportation modality option using the audiovisual data.

17. The computer-implemented method of claim 13, further comprising:

receiving, using the one or more processors, travel data including geolocation information of a user as the user travels between the first geographic location and the second geographic location; and comparing, using the one or more processors, the travel data with historical travel data associated with the recommended transportation modality option to verify the recommended transportation modality option.

18. The computer-implemented method of claim 13, further comprising:

determining, using the one or more processors and using the first geographic location and the second geographic location, a plurality of routes between the first geographic location and the second geographic location;

generating, using the one or more processors, a sustainability impact score for each of the plurality of routes, the sustainability impact score indicating an estimated climate impact of using at least one transportation modality option to travel along a route of the plurality of routes;

generating, using the one or more processors, the user interface providing the plurality of routes and the sustainability impact associated with each route, wherein the user interface further includes a travel time and a safety factor associated with each of the plurality of routes;

receiving, using the one or more processors, a selection of a selected route of the plurality of routes; and providing, using the one or more processors, the user interface including the selected route of the plurality of routes.

19. A non-transitory computer readable medium comprising instructions stored thereon that, when executed by one or more processors, cause the one or more processors to perform operations comprising:

receiving a transportation request;

identifying, using the transportation request, a first geographic location and a second geographic location associated with the transportation request;

determining, using the first geographic location and the second geographic location, a plurality of routes between the first geographic location and the second geographic location;

identifying a plurality of transportation modality options for traveling between the first geographic location and the second geographic location, each of the plurality of transportation modality options comprising at least one transportation modality;

generating, using a trained machine learning model, a sustainability impact score for each combination of the plurality of routes and the plurality of transportation modality options, the trained machine learning model trained using historical transportation data to establish at least one correlation between a sustainability metric and routes or transportation modality options, and the sustainability impact score indicating an estimated climate impact of using the at least one transportation modality along the plurality of routes;

selecting a recommended route from the plurality of routes and a recommended transportation modality option from the plurality of transportation modality options using the sustainability impact scores; and generating a user interface providing the recommended route and the recommended transportation modality option.

20. The non-transitory computer readable medium of claim 19, wherein the operations further comprise:

receiving a user preference indicating a relative preference between at least one of the plurality of transportation modality options or the plurality of routes; and selecting the recommended route and the recommended transportation modality option using the user preference.

* * * * *